United States Patent
Wu et al.

(10) Patent No.: US 12,189,876 B2
(45) Date of Patent: Jan. 7, 2025

(54) TOUCH PANEL AND PREPARATION METHOD THEREOF, AND DISPLAY TOUCH APPARATUS

(71) Applicants: Chengdu BOE Optoelectronics Technology Co., Ltd., Sichuan (CN); BOE Technology Group Co., Ltd., Beijing (CN)

(72) Inventors: Zhangmin Wu, Beijing (CN); Xinglong He, Beijing (CN); Changshuai Fang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/916,054

(22) PCT Filed: Nov. 12, 2021

(86) PCT No.: PCT/CN2021/130263
§ 371 (c)(1),
(2) Date: Sep. 30, 2022

(87) PCT Pub. No.: WO2022/179190
PCT Pub. Date: Sep. 1, 2022

(65) Prior Publication Data
US 2023/0168757 A1    Jun. 1, 2023

(30) Foreign Application Priority Data
Feb. 24, 2021  (CN) .......................... 202110210134.6

(51) Int. Cl.
*G06F 3/041*    (2006.01)
*G06F 3/044*    (2006.01)

(52) U.S. Cl.
CPC .......... *G06F 3/0412* (2013.01); *G06F 3/0445* (2019.05); *G06F 2203/04103* (2013.01);
(Continued)

(58) Field of Classification Search
CPC ................ G06F 3/0412; G06F 3/0445; G06F 2203/04103; G06F 2203/04104;
(Continued)

(56) References Cited

U.S. PATENT DOCUMENTS 11,237,661 B2 *  2/2022  Bok .................... G06F 3/04146
11,782,563 B2 * 10/2023  Wang .................. G06F 3/0448
                                                            345/173
(Continued)

FOREIGN PATENT DOCUMENTS

CN    204390203 U    6/2015
CN    106708308 A    5/2017
(Continued)

OTHER PUBLICATIONS

International Search Report for PCT/CN2021/130263 Mailed Feb. 15, 2022.
(Continued)

*Primary Examiner* — William Lu
(74) *Attorney, Agent, or Firm* — Ling Wu; Stephen Yang; Ling and Yang Intellectual Property

(57) ABSTRACT

Disclosed is a touch panel including a planar region and a bent region located on at least one side of the planar region. The touch panel has at least one notch adjacent to the bent region. The touch panel includes at least one first touch peripheral region located around the at least one notch, and a light-transmitting first trace layer is provided in the at least one first touch peripheral region.

19 Claims, 18 Drawing Sheets

(52) U.S. Cl.
CPC .............. *G06F 2203/04104* (2013.01); *G06F 2203/04107* (2013.01); *G06F 2203/04111* (2013.01)

(58) Field of Classification Search
CPC . G06F 2203/04107; G06F 2203/04111; G06F 2203/04102; G06F 3/04164; G06F 3/0443; G06F 3/041; G06F 3/044; G06F 3/0446; G06F 3/0448; G06F 2203/04112
See application file for complete search history.

(56) References Cited

U.S. PATENT DOCUMENTS

| | | | | |
|---|---|---|---|---|
| 2011/0308846 | A1* | 12/2011 | Ichiki | G06F 3/0446 430/311 |
| 2012/0212449 | A1* | 8/2012 | Kuriki | G06F 3/0446 345/174 |
| 2012/0234663 | A1* | 9/2012 | Hwang | G06F 3/0446 200/600 |
| 2012/0256851 | A1* | 10/2012 | Wang | H03K 17/96 200/600 |
| 2013/0215067 | A1* | 8/2013 | Hwang | G06F 3/0443 345/173 |
| 2013/0294037 | A1* | 11/2013 | Kuriki | H05K 9/00 174/250 |
| 2016/0035759 | A1* | 2/2016 | Kwon | H01L 27/1262 438/151 |
| 2016/0179229 | A1* | 6/2016 | Ahn | G06F 3/0447 345/173 |
| 2017/0031484 | A1* | 2/2017 | Kim | G06F 3/0446 |
| 2018/0157358 | A1* | 6/2018 | Lin | H01L 29/78675 |
| 2020/0033997 | A1* | 1/2020 | Wang | G06F 3/0443 |
| 2020/0058710 | A1* | 2/2020 | Li | H10K 59/131 |
| 2020/0110485 | A1* | 4/2020 | Lee | G06F 3/044 |
| 2020/0272260 | A1* | 8/2020 | Zhang | G06F 3/041 |
| 2020/0293140 | A1* | 9/2020 | Seo | G06F 3/04164 |
| 2020/0379595 | A1* | 12/2020 | Kim | G09G 3/32 |
| 2021/0333930 | A1* | 10/2021 | Zhao | G06F 3/04164 |
| 2022/0043535 | A1* | 2/2022 | Ke | G06F 3/0412 |
| 2022/0382432 | A1* | 12/2022 | Yan | G06F 3/0448 |
| 2022/0391040 | A1* | 12/2022 | Yan | G06F 3/0445 |

FOREIGN PATENT DOCUMENTS

| | | |
|---|---|---|
| CN | 107390939 A | 11/2017 |
| CN | 108062181 A | 5/2018 |
| CN | 108108062 A | 6/2018 |
| CN | 109032407 A | 12/2018 |
| CN | 110708408 A | 1/2020 |
| CN | 111104006 A | 5/2020 |
| CN | 111338503 A | 6/2020 |
| CN | 111385390 A | 7/2020 |
| CN | 215494957 U | 1/2022 |

OTHER PUBLICATIONS

Office Action dated Nov. 14, 2024 for Chinese Patent Application No. 202110210134.6 and English Translation.

\* cited by examiner

TOUCH PANEL AND PREPARATION METHOD THEREOF, AND DISPLAY TOUCH APPARATUS

CROSS-REFERENCE TO RELATED APPLICATIONS

The present application is a U.S. National Phase Entry of International Application No. PCT/CN2021/130263 having an international filing date of Nov. 12, 2021, which claims priority to Chinese Patent Application No. 202110210134.6 filed to the CNIPA on Feb. 24, 2021 and entitled "Touch Panel and Preparation Method thereof, and Display Touch Apparatus". The entire contents of the above-identified applications are hereby incorporated into the present application by reference.

TECHNICAL FIELD

The present disclosure relates to, but is not limited to, the field of touch technologies, and more particularly to a touch panel and a preparation method thereof, and a display touch apparatus.

BACKGROUND

With development of portable electronic display devices, a touch technology provides a new man-machine interaction interface, which is more direct and more humanized in use. The touch technology is integrated with a flat display technology to form a display touch apparatus, such that a flat display apparatus may have a touch function.

SUMMARY

The following is a summary of subject matters described herein in detail. The summary is not intended to limit the protection scope of claims.

Embodiments of the present disclosure provide a touch panel and a preparation method thereof, and a display touch apparatus.

In one aspect, an embodiment of the present disclosure provides a touch panel, which includes a planar region and a bent region located on at least one side of the planar region. The touch panel has at least one notch adjacent to the bent region. The touch panel includes at least one first touch peripheral region located around the at least one notch, and a light-transmitting first trace layer is provided in the at least one first touch peripheral region.

In some exemplary implementation modes, the planar region has multiple corner regions, and the at least one notch is located at a periphery of at least one corner region of the planar region.

In some exemplary implementation modes, the planar region is approximately in a shape of a rounded rectangle, bent regions are provided on four sides of the planar region, and a notch is provided between bent regions on adjacent two sides.

In some exemplary implementation modes, an edge of the touch panel corresponding to the at least one notch includes a first straight line segment, a circular arc segment, and a second straight line segment connected sequentially, or an edge of the touch panel corresponding to the at least one notch includes a first straight line segment, a first transition segment, a circular arc segment, a second transition segment, and a second straight line segment connected sequentially; an extension direction of the first straight line segment intersects an extension direction of the second straight line segment.

In some exemplary implementation modes, the at least one first touch peripheral region is partially overlapped with the planar region and is partially overlapped with the bent region adjacent to the at least one notch.

In some exemplary implementation modes, the touch panel further includes at least one second touch peripheral region that is at least partially overlapped with at least one bent region. A second trace layer is provided in the at least one second touch peripheral region, and the second trace layer and the first trace layer are of a different-layer structure. The first trace layer in the first touch peripheral region is electrically connected with a second trace layer in an adjacent second touch peripheral region.

In some exemplary implementation modes, the touch panel further includes a touch region that is partially overlapped with both the planar region and the at least one bent region. Multiple first touch units and multiple second touch units are disposed in the touch region; at least one first touch unit includes multiple first touch electrodes and multiple first connecting portions arranged sequentially along a first direction; at least one second touch unit includes multiple second touch electrodes and multiple second connecting portions arranged sequentially along a second direction; the first direction intersects the second direction.

In some exemplary implementation modes, the multiple first touch electrodes, the multiple second touch electrodes, and the multiple first connecting portions are disposed on a touch layer in a homo-layered manner, the multiple second connecting portions are disposed on a bridging layer, and a second connecting portion is interconnected with an adjacent second touch electrode through a via on a touch insulation layer between the bridging layer and the touch layer; or the multiple first touch electrodes, the multiple second touch electrodes, and the multiple second connecting portions are disposed on a touch layer in a homo-layered manner, the multiple first connecting portions are disposed on a bridging layer, and a first connecting portion is interconnected with an adjacent first touch electrode through a via on a touch insulation layer between the bridging layer and the touch layer.

In some exemplary implementation modes, the first trace layer and the touch layer are of a same-layer structure, and the second trace layer and the bridging layer are of a same-layer structure.

In some exemplary implementation modes, the second trace layer in the at least one second touch peripheral region includes at least one of following: multiple first touch leads and multiple second touch leads; a first touch lead is connected with a first touch unit, and a second touch lead is connected with a second touch unit. The first trace layer in the at least one first touch peripheral region includes multiple lead connecting lines, and at least one of the multiple lead connecting lines is configured to be connected with a first touch lead or a second touch lead in the adjacent second touch peripheral region.

In some exemplary implementation modes, the multiple lead connecting lines of the first trace layer have connecting end portions, and connecting end portions of adjacent lead connecting lines are arranged in a staggered manner.

In some exemplary implementation modes, a ratio of a width of a same trace on the first trace layer to a width of the same trace on the second trace layer is approximately equal to a ratio of a surface resistance of a first conductive material used for the first trace layer to a surface resistance of a second conductive material used for the second trace layer.

In some exemplary implementation modes, the first conductive material includes a conductive material having a light transmittance greater than about 90%.

In some exemplary implementation modes, the surface resistance of the first conductive material is about 10 Ω/m².

In another aspect, an embodiment of the present disclosure provides a display touch apparatus including a display panel and the touch panel as described above disposed on the display panel.

In some exemplary implementation modes, a touch base substrate of the touch panel is disposed on the display panel to form an Add on Mode structure.

In some exemplary implementation modes, an encapsulation layer of the display panel is used as a touch base substrate of the touch panel to form an On-Cell structure.

In some exemplary implementation modes, at least one corner region of a planar region of the touch panel has a circular arc-shaped edge, and the circular arc-shaped edge of the corner region faces a circular arc-shaped edge of the display panel.

In some exemplary implementation modes, an orthographic projection of at least one notch of the touch panel on the display panel is partially overlapped with a display region of the display panel.

In another aspect, an embodiment of the present disclosure provides a preparation method of a touch panel. The touch panel includes a planar region and a bent region located on at least one side of the planar region; the touch panel has at least one notch adjacent to the bent region. The preparation method includes forming a light-transmitting first trace layer in at least one first touch peripheral region located around the at least one notch.

In some exemplary implementation modes, the preparation method further includes forming a second trace layer in at least one second touch peripheral region that is at least partially overlapped with at least one bent region, the first trace layer in the first touch peripheral region being electrically connected with a second trace layer in an adjacent second touch peripheral region.

Other aspects will become apparent upon reading and understanding of drawings and detailed description.

BRIEF DESCRIPTION OF DRAWINGS

The drawings are intended to provide an understanding of technical solutions of the present disclosure and constitute a part of the specification, and are intended to explain the technical solutions of the present disclosure together with the embodiments of the present disclosure and do not constitute a limitation on the technical solutions of the present disclosure. Shapes and sizes of one or more components in the drawings do not reflect true scales, and are only intended to schematically describe contents of the present disclosure.

DETAILED DESCRIPTION

Figure 1:
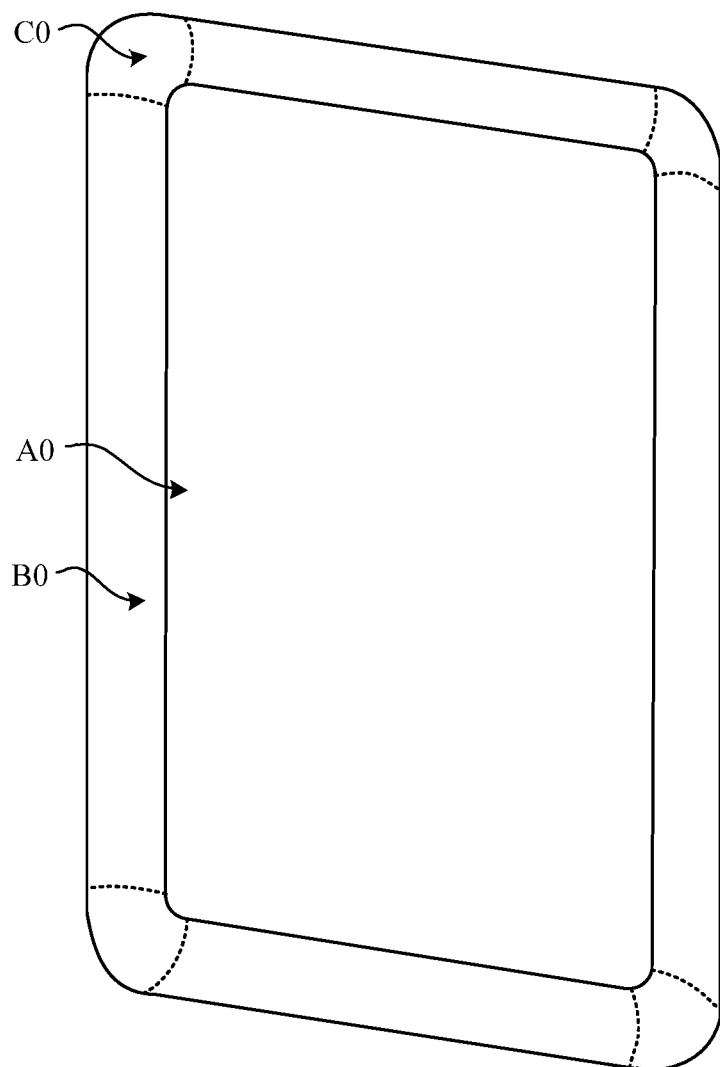
FIG. 1 is a schematic diagram of a 4-bent surface display product.

Embodiments of the present disclosure will be described below in combination with the drawings in detail. Implementation modes may be implemented in multiple different forms. Those of ordinary skills in the art may readily understand a fact that modes and contents may be transformed into one or more forms without departing from the purpose and scope of the present disclosure. Therefore, the present disclosure should not be interpreted as being limited to the contents recorded in the following implementation modes only. The embodiments in the present disclosure and features in the embodiments may be arbitrarily combined with each other without conflict.

Sometimes for the sake of clarity, a size of one or more constituent elements, a thickness of a layer, or a region in the drawings may be exaggerated. Therefore, one mode of the present disclosure is not necessarily limited to the size, and shapes and sizes of various components in the drawings do not reflect true scales. In addition, the drawings schematically illustrate ideal examples, and one mode of the present disclosure is not limited to shapes or numerical values shown in the drawings.

Ordinal numerals such as "first", "second", "third", and the like in the present disclosure are set in order to avoid confusion of constituent elements, but not to set a limit in quantity. In the present disclosure, "multiple" may refer to two or more than two.

For convenience, wordings such as "middle", "upper", "lower", "front", "back", "vertical", "horizontal", "top", "bottom", "inside", "outside" and the like indicating orientation or positional relationships are used in the present disclosure to illustrate positional relationships between the constituent elements with reference to the drawings, and are intended to facilitate description of the specification and simplification of the description, but not to indicate or imply that a referred apparatus or element must have a specific orientation or be constructed and operated in a specific orientation, therefore, they should not be understood as limitations on the present disclosure. The positional relationships between the constituent elements are appropriately changed according to directions of the constituent elements described. Therefore, wordings used in the specification are not limited and appropriate substitutions may be made according to situations.

Unless otherwise specified and defined explicitly, terms "installed", "coupled" and "connected" should be understood in a broad sense in the present disclosure. For example, a connection may be a fixed connection, a detachable connection, or an integrated connection, or may be a mechanical connection or an electrical connection, or may be a direct connection, an indirect connection through an intermediate component, or communication inside two components. For those ordinarily skilled in the art, specific meanings of the above terms in the present disclosure may be understood according to specific situations. An "electrical connection" includes a case where constituent elements are connected together through an element with some electric action. The "element with some electric action" is not particularly limited as long as electrical signals may be sent and received between the connected constituent elements. Examples of the "element with some electric action" not only include an electrode and a wiring, but also include a switching element such as a transistor, a resistor, an inductor, a capacitor, another element with one or more functions, etc.

In the present disclosure, a transistor refers to an element which at least includes three terminals, a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. In the present disclosure, the channel region refers to a region which the current mainly flows through.

In the present disclosure, in order to distinguish between two electrodes of the transistor except the gate electrode, one of the two electrodes is referred to as a first electrode and the other is referred to as a second electrode. The first electrode may be a source electrode or a drain electrode, and the second electrode may be a drain electrode or a source electrode. In addition, the gate electrode of the transistor is referred to as a control electrode. In a case that transistors with opposite polarities are used or a case that a direction of a current is changed during circuit operation, functions of the "source electrode" and the "drain electrode" are sometimes interchanged. Therefore, the "source electrode" and the "drain electrode" may be interchanged in the present disclosure.

In the present disclosure, "parallel" refers to a state in which an angle formed by two straight lines is −10° or more and 10° or less, and thus also includes a state in which the angle is −5° or more and 5° or less. In addition, "vertical" refers to a state in which an angle formed by two straight lines is 80° or more and 100° or less, and thus also includes a state in which the angle is 85° or more and 95° or less.

In the present disclosure, a "film" and a "layer" may be interchangeable. For example, sometimes a "conductive layer" may be replaced by a "conductive film". Similarly, sometimes an "insulation film" may be replaced by an "insulation layer".

"About" and "approximate" in the present disclosure refer to a case that a boundary is not defined strictly and numerical values within process and measurement error ranges are allowed.

With development of display technologies, stereoscopic display products, such as double-bent surface electronic devices and 4-bent surface electronic devices, emerge gradually, to provide better visual experience. FIG. 1 is a schematic diagram of a 4-bent surface display product. As shown in FIG. 1, the 4-bent surface display product includes a planar region A0 and bent regions B0 located around the planar region A0. The bent regions B0 surround a periphery of the planar region A0. A touch panel carried by the 4-bent surface display product as shown in FIG. 1 is a rounded rectangle matching an external form of the 4-bent surface display product, and the touch panel needs to be bent on four sides. However, when the touch panel is bent on four sides, four corner positions (e.g., four corner positions C0 in FIG. 1) will be squeezed in different directions (including, for example, squeezing stresses in two vertical directions), which is prone to wrinkles, causing cracks or fractures to occur in a circuit of the touch panel, thereby resulting in poor touch.

In other embodiments, the display product may be a display product with a bent surface on at least one side. When at least one side is bent, a corner position will also be squeezed in at least one direction and is prone to wrinkles, causing cracks or fractures to occur in a circuit of the touch panel, thereby resulting in poor touch. In some embodiments, the display product may be a display product with bent surfaces on two adjacent sides or a display product with bent surfaces on two opposite sides.

At least one embodiment of the present disclosure provides a touch panel, which includes a planar region and a bent region located on at least one side of the planar region. The touch panel has at least one notch adjacent to the bent region. The touch panel includes at least one first touch peripheral region located around the at least one notch. A light-transmitting first trace layer is provided in the at least one first touch peripheral region. In some examples, the touch panel is a unilateral bent surface product, and the touch panel may have one or two notches. For example, the two notches are respectively located at corner positions adjacent to a side where the bent region of the touch panel is located. Or, the touch panel is a multilateral bent product. For example, the touch panel is approximately rectangular, and the touch panel may have four notches, which are located at four corner positions of the touch panel respectively. However, this embodiment is not limited thereto. In some examples, the touch panel may be of another heteromorphic structure. For example, the touch panel may have N sides and N corners, N being an integer greater than 2. A bent region is provided on at least one of the N sides, and a notch is provided at at least one corner adjacent to the bent region.

In the present disclosure, light transmission refers to a case where a transmittance of light is greater than about 90%, and non-light transmission refers to a case where the transmittance of light is not greater than 90%.

In the touch panel according to the embodiment of the present disclosure, by forming notches at adjacent positions of the bent region and arranging traces around the notches in a relatively flat first touch peripheral region, the touch panel may be prevented from being bent to generate wrinkles, which will cause a damage to a touch circuit, thereby improving a touch effect. Moreover, an influence of setting of the notches on a display effect of a display region of a display touch apparatus where the touch panel is located may be avoided by setting the first trace layer in the first touch peripheral region to be light-transmitting.

In some exemplary implementation modes, the planar region has multiple corner regions, and at least one notch is located at a periphery of at least one corner region of the planar region. In some examples, the planar region is approximately in a shape of a rounded rectangle, bent regions are provided on four sides of the planar region, and a notch is provided between the bent regions on two adjacent sides. In this example, the planar region has four corner regions, each of which has a circular arc-shaped edge, and a notch is formed at a periphery of each corner region of the planar region. However, this embodiment is not limited thereto.

In some exemplary implementation modes, an edge of the touch panel corresponding to the at least one notch includes a first straight line segment, a circular arc segment, and a second straight line segment connected sequentially. An extension direction of the first straight line segment intersects an extension direction of the second straight line segment. For example, extension lines of the first straight line segment and the second straight line segment intersect at a center of a circle corresponding to the circular arc segment, and a central angle corresponding to the circular arc segment is about 80 degrees to 100 degrees, for example, 90 degrees. In some examples, the touch panel is approximately in a shape of a rounded rectangle before the notches are formed, and notches approximately in a shape of a fan ring may be formed at four corner positions.

In some exemplary implementation modes, the edge of the touch panel corresponding to the at least one notch may include a first straight line segment, a first transition segment, a circular arc segment, a second transition segment, and a second straight line segment connected sequentially. An extension direction of the first straight line segment intersects an extension direction of the second straight line segment. For example, the first transition segment and the second transition segment are circular arc lines, and a guide angle connecting the circular arc segment and straight line segments may be formed. However, this embodiment is not limited thereto. For example, an edge of a notch may be formed by connecting multiple straight line segments.

In some exemplary implementation modes, the first touch peripheral region around the at least one notch is partially overlapped with the planar region and is partially overlapped with the bent regions adjacent to the at least one notch. In some examples, the first touch peripheral region may be a region formed by communicating an edge portion of a corner region of the planar region close to the notch with an edge portion of a bent region adjacent to the corner region close to the notch.

In some exemplary implementation modes, the touch panel further includes at least one second touch peripheral region that at least is partially overlapped with at least one bent region. A second trace layer is provided in the at least one second touch peripheral region. The second trace layer and the first trace layer are of a different-layer structure. The first trace layer in the first touch peripheral region is electrically connected with the second trace layer in an adjacent second touch peripheral region. In this example, the first touch peripheral region is communicated with the second touch peripheral region to form a touch peripheral region surrounding a touch region of the touch panel. In some examples, the second trace layer may be a non-light transmitting trace layer. However, this embodiment is not limited thereto. In some examples, both the second trace layer and the first trace layer may be light-transmitting trace layers. In some examples, the first trace layer and the second trace layer may be arranged on a same layer.

In some exemplary implementation modes, the touch panel further includes the touch region that is partially overlapped with both the planar region and the at least one bent region. Multiple first touch units and multiple second touch units are arranged in the touch region. At least one first touch unit includes multiple first touch electrodes and multiple first connecting portions arranged along a first direction sequentially; at least one second touch unit includes multiple second touch electrodes and multiple second connecting portions arranged along a second direction sequentially. The first direction intersects the second direction.

In some exemplary implementation modes, the multiple first touch electrodes, the multiple second touch electrodes, and the multiple first connecting portions are arranged on a touch layer in a homo-layered manner, the multiple second connecting portions are arranged on a bridging layer, and a second connecting portion is interconnected with an adjacent second touch electrode through a via on a touch insulation layer between the bridging layer and the touch layer; or the multiple first touch electrodes, the multiple second touch electrodes, and the multiple second connecting portions are arranged on the touch layer in a homo-layered manner, the multiple first connecting portions is arranged on a bridging layer, and a first connecting portion is interconnected with an adjacent first touch electrode through the via on the touch insulation layer between the bridging layer and the touch layer. However, this embodiment is not limited thereto.

In some exemplary implementation modes, the first trace layer and the touch layer are of a same-layer structure, and the second trace layer and the bridging layer are of a same-layer structure. However, this embodiment is not limited thereto. For example, the first trace layer and the touch layer are of a different-layer structure, the first trace layer and the bridging layer are of a different-layer structure, and the second trace layer and the bridging layer are of a same-layer structure. Or, for example, the first trace layer, the second trace layer, and the touch layer are of a same-layer structure.

In some exemplary implementation modes, the second trace layer in the at least one second touch peripheral region includes at least one of: multiple first touch leads and multiple second touch leads. A first touch lead is connected with a first touch unit, and a second touch lead is connected with a second touch unit. The first trace layer in the at least one first touch peripheral region includes multiple lead connecting lines. At least one of the multiple lead connecting lines is configured to be connected with a first touch lead or a second touch lead in an adjacent second touch peripheral region.

In some exemplary implementation modes, the multiple lead connecting lines of the first trace layer have connecting end portions, and connecting end portions of adjacent lead connecting lines are arranged in a staggered manner. In this exemplary implementation mode, a pitch between the adjacent lead connecting lines may be reduced by arranging the connecting end portions of the adjacent lead connecting lines in the staggered manner, to support implementation of a touch panel with a narrow border.

In some exemplary implementation modes, a ratio of a width of a same trace on the first trace layer to a width of the same trace on the second trace layer is approximately equal to a ratio of a surface resistance of a first conductive material used in the first trace layer to a surface resistance of a second conductive material used in the second trace layer. In this exemplary implementation mode, widths of the same trace on the first trace layer and the second trace layer are set according to a ratio relationship of surface resistances of conductive materials of the first trace layer and the second trace layer, so that consistency of an overall trace impedance may be ensured.

In some exemplary implementation modes, the first conductive material may include a conductive material having a light transmittance greater than about 90% and the second conductive material may include a metal material. For example, the first conductive material may be a metal material having a light transmittance greater than about 90% or may be a transparent conductive material such as Indium Tin Oxide (ITO). However, this embodiment is not limited thereto.

In some exemplary implementation modes, a surface resistance of the first conductive material is about 10 $\Omega/m^2$. However, this embodiment is not limited thereto.

In some exemplary embodiments, surface resistances of materials of the first touch electrode and the second touch electrode are greater than the surface resistance of the first conductive material, for example, may be greater than about 4 times the surface resistance of the first conductive material.

At least one embodiment of the present disclosure further provides a display touch apparatus, which includes a display panel and a touch panel disposed on the display panel. In some exemplary implementation modes, the display panel may be a Liquid Crystal Display (LCD) panel, or may be an Organic Light Emitting Diode (OLED) display panel, or may be a Plasma Display Panel (PDP), or may be an Electrophoresis Display panel (EPD). In some examples, the display panel may be an OLED display panel. An OLED is an active light emitting display device that has advantages, such as self-luminescence, a wide viewing angle, a high contrast ratio, low power consumption, and an extremely high response speed. With continuous development of display technologies, a flexible display that uses the OLED as a light emitting device and uses a Thin Film Transistor (TFT) for signal control has become a mainstream product in the field of display at present.

In some exemplary implementation modes, the touch panel may be an Add On mode touch panel. The touch panel may be bonded to the display panel in a face-bonded manner of coating an entire surface with Optical Clear Resin (OCR) or Optical Clear Adhesive (OCA) or be bonded to the display panel in a frame-bonded manner of coating frame adhesive on peripheral edges. However, this embodiment is not limited thereto.

Figure 2:
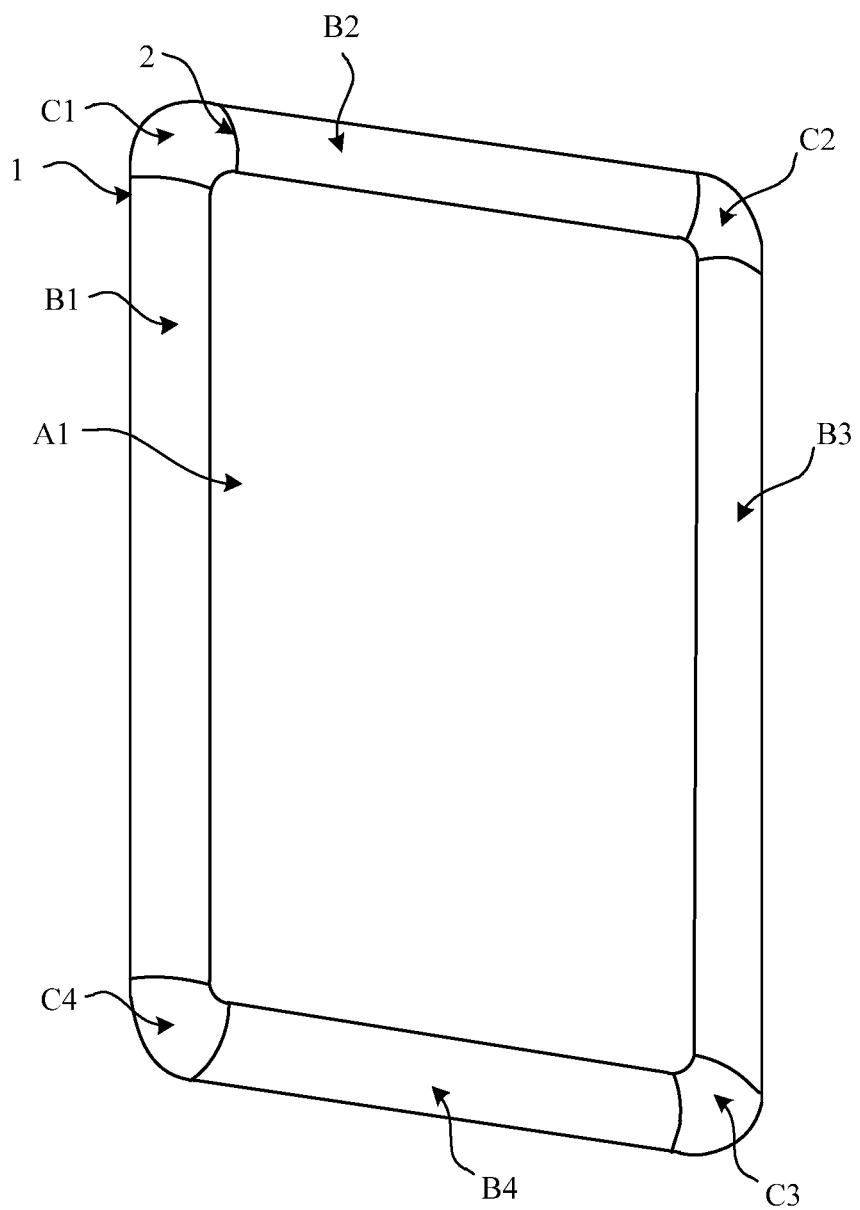
FIG. 2 is a schematic stereogram of a display touch apparatus according to at least one embodiment of the present disclosure.
Figure 3:
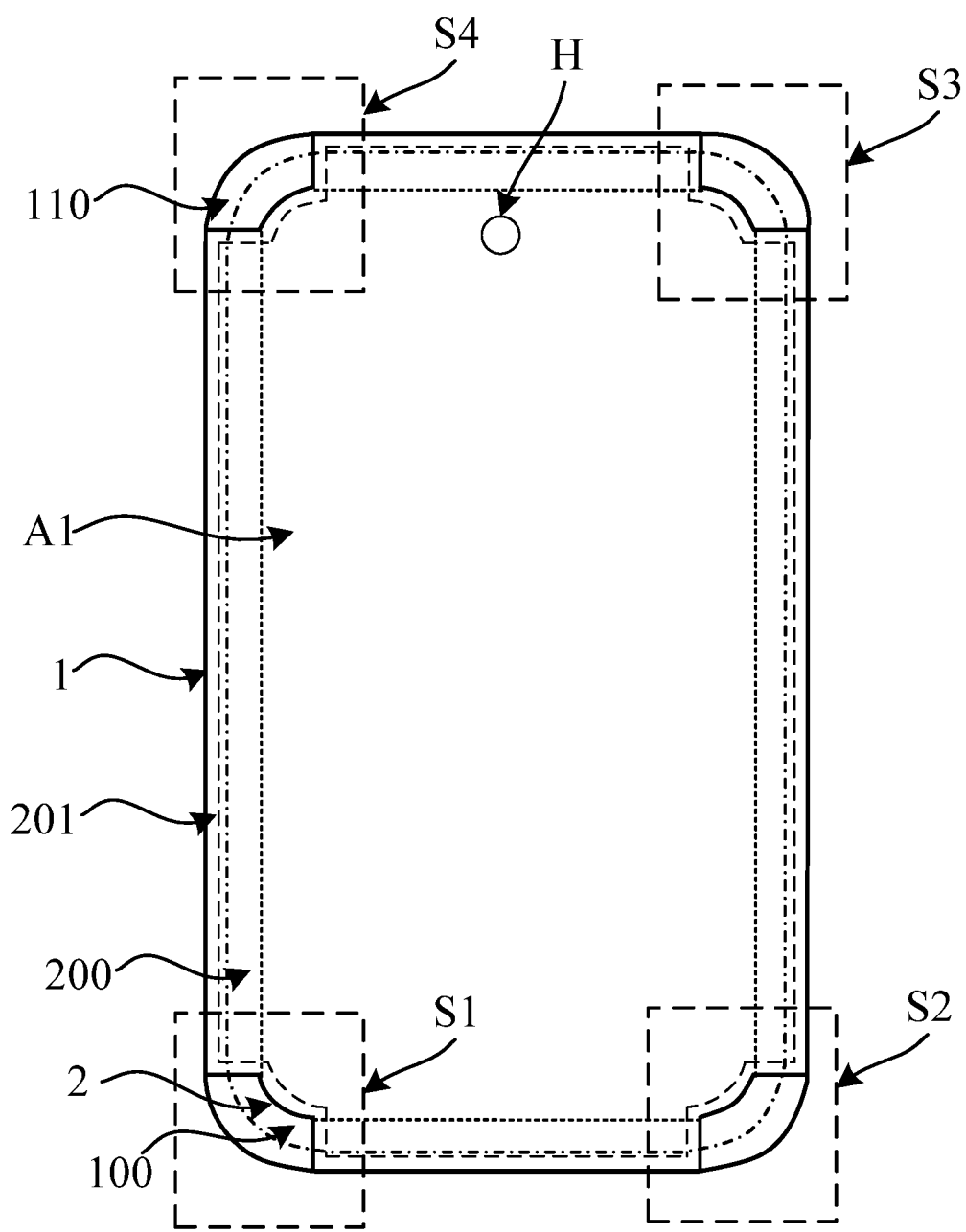
FIG. 3 is a schematic plane view of a display touch apparatus according to at least one embodiment of the present disclosure.
Figure 4:
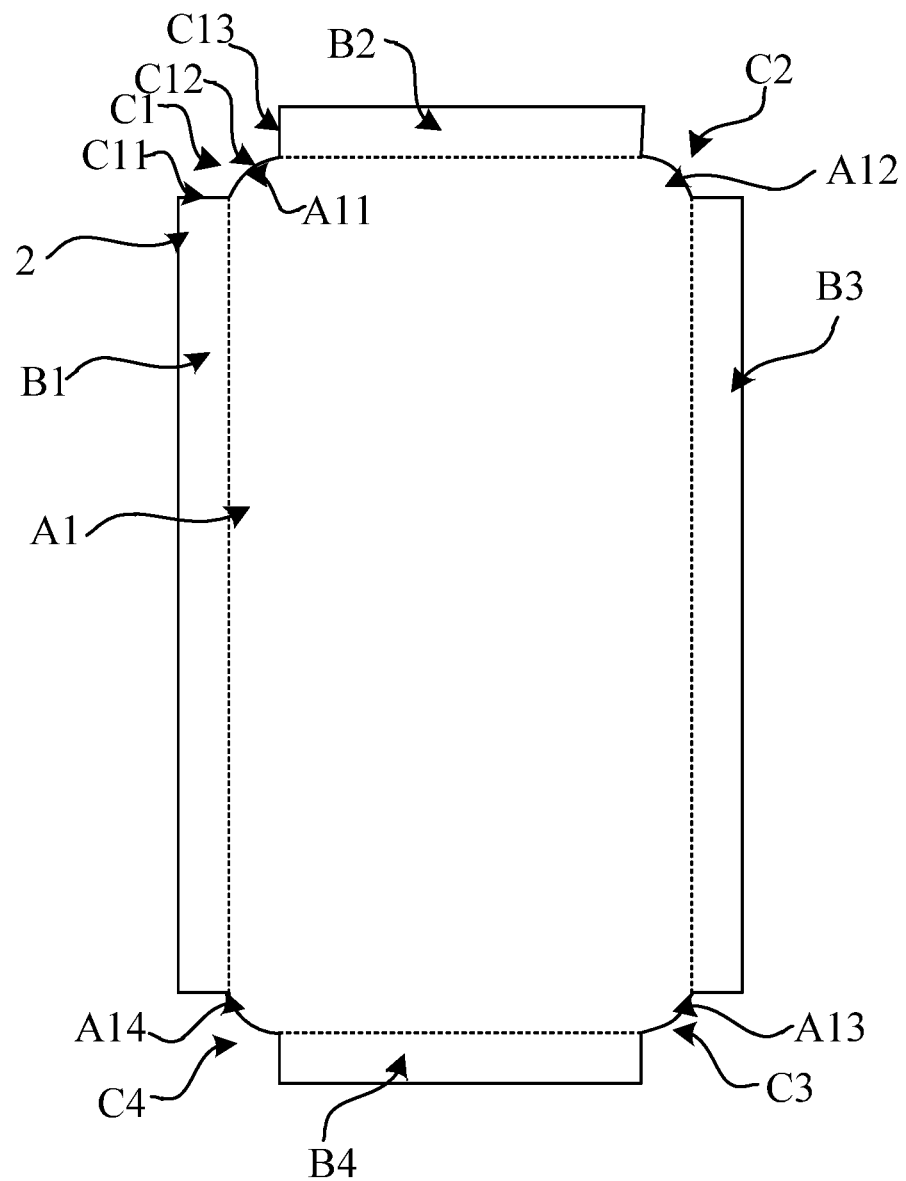
FIG. 4 is a schematic plane view of a touch panel according to at least one embodiment of the present disclosure.

FIG. 2 is a schematic stereogram of a display touch apparatus according to at least one embodiment of the present disclosure. FIG. 3 is a schematic plane view of a display touch apparatus according to at least one embodiment of the present disclosure. FIG. 3 is a schematic top view of the display touch apparatus shown in FIG. 2 with its four sides being in an unbent state. FIG. 4 is a schematic plane view of a touch panel according to at least one embodiment of the present disclosure. FIG. 4 is a schematic top view of the touch panel of the display touch apparatus shown in FIG. 2 with its four sides being in the unbent state.

In some exemplary implementation modes, as shown in FIGS. 2 to 4, the display touch apparatus includes a display panel 1 and a touch panel 2 which are stacked. The touch panel 2 may be disposed on the display panel 1 in a bonded manner to form an Add on Mode structure. In a plane parallel to the display touch apparatus, the touch panel 2 includes a touch region 200 and a touch peripheral region 201 located at a periphery of the touch region 200. The display panel 1 includes a display region 100 and a display peripheral region 110 located at a periphery of the display region 100. For example, the display panel 1 is approximately in a shape of a rounded rectangle. A dash line in FIG. 3 may represent a boundary of the touch region 200 of the touch panel 2 and a dot dash line in FIG. 3 may represent a boundary of the display region 100 of the display panel 1. A dotted line in FIG. 3 represents an intersection boundary between a planar region A1 and a bent region of the touch panel 2. In some examples, an orthographic projection of the touch region 200 of the touch panel 2 on the display panel 1 is partially overlapped with the display region 100. However, this embodiment is not limited thereto. In some examples, the display region 100 of the display panel 1 may cover the orthographic projection of the touch region 200 of the touch panel 2 on the display panel 1.

In some exemplary implementation modes, as shown in FIG. 3, the touch panel 2 may have a first open pore H. An optical device such as a camera, an infrared light detector or the like may be provided on one side of the display panel 1 away from the touch panel 2. An orthographic projection of the optical device on the touch panel 2 is overlapped with the first open pore H. In some examples, a second open pore overlapping with an orthographic projection of the first open pore H may be provided in the display panel 1. Providing an open pore in the touch panel 2 is beneficial for the optical device to receive external light. However, this embodiment is not limited thereto.

In some exemplary implementation modes, as shown in FIGS. 2 to 4, the touch panel 2 includes a planar region A1 and bent regions located on four sides of the planar region A1. As shown in FIG. 4, the planar region A1 has four corner regions A11, A12, A13, and A14. The four corner regions A11 to A14 have, for example, circular arc-shaped edges. Radians of the circular arc-shaped edges of the four corner regions A11 to A14 may be the same, for example, the planar region A1 is approximately in a shape of a rounded rectangle; or the radians of the circular arc-shaped edges of the four corner regions A11 to A14 may be different or radians of at least two of the corner regions may be the same. However, this embodiment is not limited thereto.

In some exemplary implementation modes, as shown in FIGS. 2 to 4, the circular arc-shaped edges of the corner regions of the planar region A1 of the touch panel 2 face circular arc-shaped edges of the display panel 1. In this example, both the four corner regions of the planar region A1 and four corner regions of the display panel 1 are circular arc-shaped, that is, have circular arc-shaped edges. However, this embodiment is not limited thereto.

In some examples, as shown in FIGS. 2 to 4, the bent regions on the four sides of the planar region A1 are rectangular regions extending outward from the four sides of the planar region A1, respectively. However, this embodiment is not limited thereto. For example, the bent regions may be trapezoidal regions extending outward from the four sides of the planar region A1; or the bent regions may be in another shape. In some examples, shapes of the four bent regions may be different or at least two of the bent regions may be the same.

In some examples, as shown in FIGS. 2 to 4, the bent regions on the four sides of the planar region A1 include a first bent region B1, a second bent region B2, a third bent region B3, and a fourth bent region B4. For example, the first bent region B1 is located on a left side of the planar region A1, the second bent region B2 is located on an upper side of the planar region A1, the third bent region B3 is located on a right side of the planar region A1, and the fourth bent region B4 is located on a lower side of the planar region A1. The first bent region B1 and the third bent region B3 are opposite to each other, and the second bent region B2 and the fourth bent region B4 are opposite to each other. In some examples, the four bent regions are approximately rectangular. In some examples, sizes of the first bent region B1 and the third bent region B3 may be the same, and sizes of the second bent region B2 and the fourth bent region B4 may be the same. However, this embodiment is not limited thereto. For example, a size of the third bent region B3 may be larger than a size of the first bent region B1, or a size of the fourth bent region B4 may be larger than a size of the second bent region B2. In addition, shapes and sizes of the four bent regions are not limited in this embodiment.

In some exemplary implementation modes, as shown in FIGS. 2 to 4, the touch panel 2 has four notches, each of which is located between two adjacent bent regions. The four notches are all adjacent to the planar region A1. As shown in FIG. 2, the four notches are located at four corner positions of the touch panel 2 respectively. As shown in FIG. 4, the four notches are located at peripheries of the four corner regions of the planar region A1 respectively. A first notch C1 is provided between the first bent region B1 and the second bent region B2, a second notch C2 is provided between the second bent region B2 and the third bent region B3, a third notch C3 is provided between the third bent region B3 and the fourth bent region B4, and a fourth notch C4 is provided between the fourth bent region B4 and the first bent region B1. The first notch C1 is located at a periphery of the corner region A11 of the planar region A1, and is surrounded by the corner region A11 of the planar region A1, the first bent region B1, and the second bent region B2. The second notch C2 is located at a periphery of the corner region A12 of the planar region A1, and is surrounded by the corner region A12 of the planar region A1, the second bent region B2, and the third bent region B3. The third notch C3 is located at a periphery of the corner region A13 of the planar region A1, and is surrounded by the corner region A13 of the planar region A1, the third bent region B3, and the fourth bent region B4. The fourth notch C4 is located at a periphery of the corner region A14 of the planar region A1, and is surrounded by the corner region A14 of the planar region A1, the fourth bent region B4, and the first bent region B1.

In some exemplary implementation modes, as shown in FIG. 3, orthographic projections of the four notches on the display panel 1 are partially overlapped with the display region 100 of the display panel 1. An orthographic projection of each notch on the display panel 1 is overlapped with both the display region 100 and the display peripheral region 110 of the display panel 1.

In some examples, shapes of the first notch C1, the second notch C2, the third notch C3, and the fourth notch C4 may be the same. As shown in FIG. 4, the first notch C1 is illustrated as an example. An edge of the touch panel 2 corresponding to the first notch C1 includes a first edge C11, a second edge C12, and a third edge C13 connected sequentially. The first edge C11 is an edge of the first bent region B1, the second edge C12 is an edge of the corner region A11 of the planar region A1, and the third edge C13 is an edge of the second bent region B2. The first edge C11 and the third edge C13 may be straight line segments, and the second edge C12 may be a circular arc segment. For example, lengths of the first edge C11 and the third edge C13 each may be about 10.8 millimeters (mm), and a central angle corresponding to the second edge C12 is about 90 degrees. In some examples, the touch panel 2 may be approximately in a shape of a rounded rectangle before the notches are formed, the first notch C1 may be approximately fan ring-shaped, and its corresponding central angle is about 90 degrees. However, this embodiment is not limited thereto. In some examples, the first notch C1, the second notch C2, the third notch C3, and the fourth notch C4 each may be approximately fan ring-shaped and degrees of their corresponding central angles may be different from each other. In some examples, shapes of the first notch C1, the second notch C2, the third notch C3, and the fourth notch C4 may be different from each other, or at least two of them are the same.

In some exemplary implementation modes, as shown in FIGS. 2 to 4, the touch region 200 of the touch panel 2 is partially overlapped with both the planar region A1 and the four bent regions (i.e., the first bent region B1 to the fourth bent region B4). Edges of the planar region A1 close to the four notches (i.e., the first notch C1 to the fourth notch C4) do not belong to the touch region 200. A portion of at least one bent region away from the planar region 200 does not belong to the touch region 200. A shape of a boundary of the touch region 200 is similar to a shape of a boundary of the touch panel 2. In this example, boundaries of the touch region 200 and the touch panel 2 have a similarity of more than 90%, that is, at more than 90% of boundary positions, shapes of the boundaries of the touch region 200 and the touch panel 2 may be the same.

In some exemplary implementation modes, as shown in FIGS. 3 and 4, the touch peripheral region 201 includes four first touch peripheral regions and four second touch peripheral regions. The four first touch peripheral regions are respectively located at four corner positions of the touch panel 2 and are overlapped with the display region 100 of the display panel. Each first touch peripheral region is connected with two adjacent second touch peripheral regions. Each first touch peripheral region is partially overlapped with the planar region A1 around a notch and two adjacent bent regions. Regions where the first touch peripheral regions are overlapped with the planar region A1 are located at the corner regions of the planar region A1. Each first touch peripheral region is located between a notch and the touch region 200. The four second touch peripheral regions are in a one-to-one correspondence with the four bent regions, and each second touch peripheral region is partially overlapped with one bent region. However, this embodiment is not limited thereto.

Figure 5:
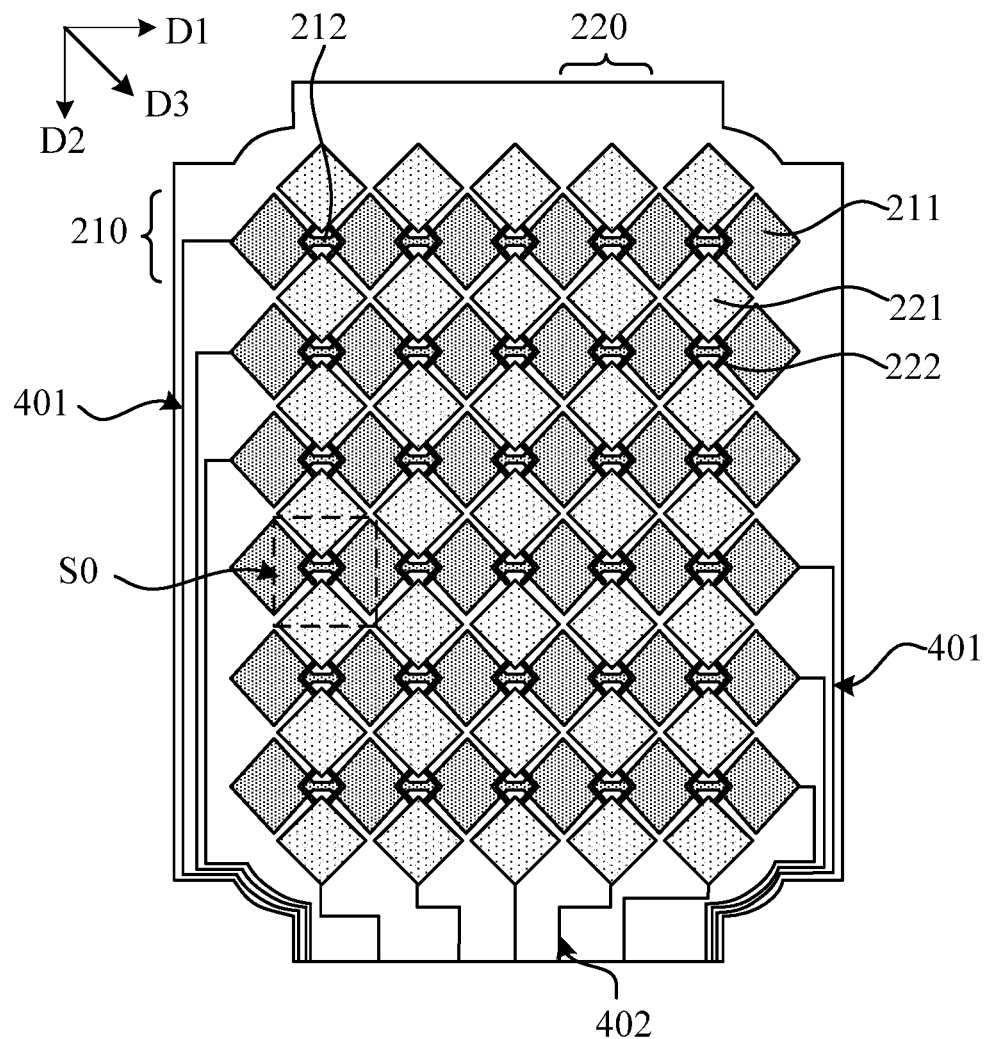
FIG. 5 is a schematic diagram of a drive architecture of a touch panel according to at least one embodiment of the present disclosure.

FIG. 5 is a schematic diagram of a drive architecture of a touch panel according to at least one embodiment of the present disclosure. In some exemplary implementation modes, the touch panel may be a mutual capacitance structure. In the mutual capacitance structure, a first touch electrode and a second touch electrode are overlapped each other to form a mutual capacitance, and position detection is performed using a change of the mutual capacitance. The mutual capacitance touch panel is of a multi-layer structure and has features, such as multi-touch. However, this embodiment is not limited thereto. For example, the touch panel may be a self-capacitance structure, in which a self-capacitance is formed by a touch electrode and a human body, and position detection is performed using a change of the self-capacitance. The self-capacitance touch panel is of a single-layer structure and has features, such as low power consumption and a simple structure.

In some exemplary implementation modes, as shown in FIG. 5, the touch region may include multiple first touch units 210 and multiple second touch units 220. The first touch units 210 extend along a first direction D1, and the multiple first touch units 210 are arranged along a second direction D2 sequentially. The second touch units 220 extend along the second direction D2, and the multiple second touch units 220 are arranged along the first direction D1 sequentially. The first direction D1 intersects the second direction D2, for example, the first direction D1 is perpendicular to the second direction D2. Each first touch unit 210 includes multiple first touch electrodes 211 and multiple first connecting portions 212 which are arranged along the first direction D1 sequentially, and the first touch electrodes 211 and the first connecting portions 212 are arranged alternately and are connected sequentially. Each second touch unit 210 includes multiple second touch electrodes 221 arranged along the second direction D2 sequentially, the multiple second touch electrodes 221 are arranged at intervals, and adjacent second touch electrodes 221 are connected with each other via second connecting portions 222. In some examples, film layers where the second connecting portions 222 are located are different from film layers where the first touch electrodes 211 and the second touch electrodes 221 are located. The first touch electrodes 211 and the second touch electrodes 221 are arranged alternately along a third direction D3, and the third direction D3 intersects the first direction D1 and the second direction D2. However, this embodiment is not limited thereto. Only six first touch units and five second touch units are illustrated as an example in FIG. 5, and each first touch unit consisting of only six first touch electrodes and each second touch unit consisting of seven second touch electrodes are illustrated as an example. Quantities of the first touch units, the second touch units, the first touch electrodes, and the second touch electrodes on the touch panel are not limited in this embodiment.

In some exemplary implementation modes, the multiple first touch electrodes 211, the multiple second touch electrodes 221, and the multiple first connecting portions 212 may be disposed on a touch layer in a homo-layered manner, and may be formed through a same patterning process. The first touch electrodes 211 and the first connecting portions 212 may be connected with each other to form an integral structure. The second connecting portions 222 may be arranged on a bridging layer and adjacent second touch electrodes 221 are connected with each other through a via. A touch insulation layer is arranged between the touch layer and the bridging layer. In some other examples, the multiple first touch electrodes 211, the multiple second touch electrodes 221, and the multiple second connecting portions 222 may be arranged on the touch layer in a homo-layered manner. The second touch electrodes 221 and the second connecting portions 222 may be connected with each other to form an integral structure. The first connecting portions 212 may be arranged on the bridging layer and adjacent first touch electrodes 211 are connected with each other through a via. In some exemplary implementation modes, the first touch electrodes 111 may be sensing (Rx) electrodes and the second touch electrodes 121 may be drive (Tx) electrodes. Or, the first touch electrodes may be drive (Tx) electrodes and the second touch electrodes may be sensing (Rx) electrodes. However, this embodiment is not limited thereto.

In some exemplary implementation modes, as shown in FIG. 5, the first touch electrodes 211 and the second touch electrodes 221 may be rhombic, for example, they may be in a shape of a square rhombus or a transversally long rhombus or a longitudinally long rhombus. However, this embodiment is not limited thereto. In some examples, the first touch electrodes 211 and the second touch electrodes 221 may be in a shape of any one or more of a triangle, a square, a trapezoid, parallelogram, a pentagon, a hexagon, and another polygon.

In some exemplary implementation modes, a majority of the first touch electrodes in the touch region are rhombic, and a minority of the first touch electrodes located at edges may be in a shape of an isosceles triangle, or may be in a shape matching edges of the touch region. A majority of the second touch electrodes are rhombic, and a minority of the second touch electrodes located at edges are in a shape of an isosceles triangle, or may be in a shape matching the edges of the touch region. However, this embodiment is not limited thereto.

In some exemplary implementation modes, the first touch electrodes 211 and the second touch electrodes 221 may be in a form of a metal grid, the metal grid is formed by interweaving of multiple metal wires and includes multiple grid patterns, and the grid patterns are polygons formed by multiple metal wires. In some examples, shapes of the grid patterns formed by the metal wires may be regular or irregular, and edges of the grid patterns may be straight lines or curves, the embodiment of the present disclosure is not limited thereto. In some examples, widths of the metal wires may be less than or equal to 5 microns ($\mu$m). The first touch electrodes 211 and the second touch electrodes 221 in the form of the metal grid have advantages, such as a small resistance, a small thickness, and a fast response speed. However, this embodiment is not limited thereto. For example, the first touch electrodes and the second touch electrodes may be in a form of a transparent conductive electrode.

Figure 6:
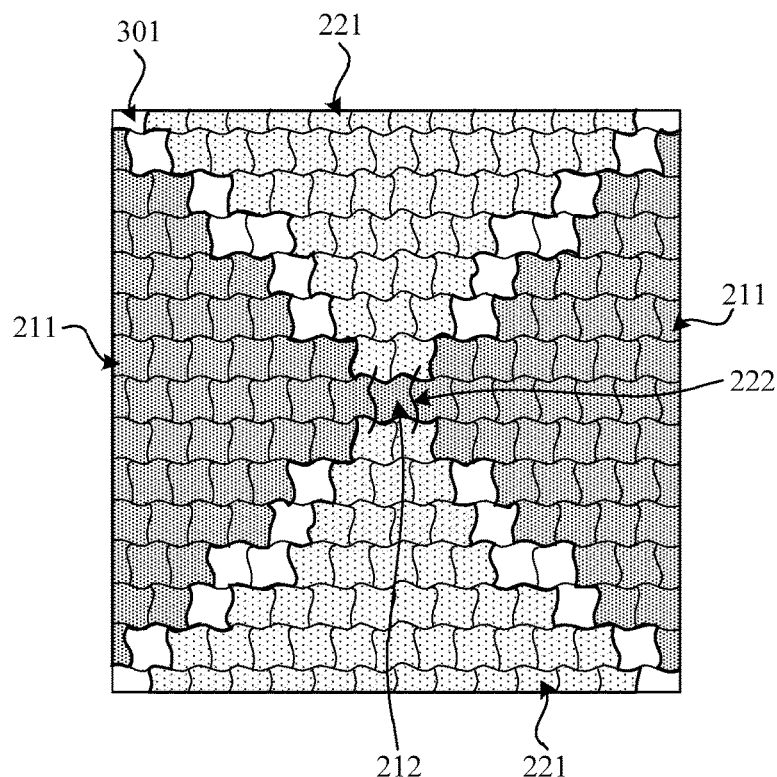
FIG. 6 is a schematic structural diagram of touch electrodes in a form of a metal grid according to at least one embodiment of the present disclosure.

FIG. 6 is a schematic structural diagram of touch electrodes in a form of a metal grid according to at least one embodiment of the present disclosure, which is a schematic partial enlarged view of a region S0 in FIG. 5. In this example, the grid patterns are rhombic, and the edges of the grid patterns may be curves. As shown in FIG. 6, in order to insulate the first touch electrodes 211 from the second touch electrodes 221 from each other, multiple cuts 30, which disconnect the metal wires of the grid patterns, are provided in the metal grid, to form invalid connection regions 301 between the first touch electrodes 211 and the second touch electrodes 221, thereby achieving isolation of grid patterns of the first touch electrodes 211 from grid patterns of the second touch electrodes 221. In some embodiments, a cut may be a straight line or a polyline formed by connecting a portion of straight lines, further solving a visualization problem at a broken line of the cut.

In some exemplary implementation modes, a cut may be provided in each grid pattern located in the invalid connection regions 301. The cut cuts off metal wires of the grid pattern so that each grid pattern is divided into two parts, one part belonging to a first touch electrode 211 and the other part belonging to a second touch electrode 221, or one part belonging to the second touch electrode 221 and the other part belonging to the first touch electrode 211. In some examples, a first connecting portion 212 may form an integral structure with a first touch electrode 211 and be configured to implement connection between two first touch electrodes 211. For example, the first connecting portion 212 may be a grid pattern connecting two first touch electrodes 211. A second connecting portion 222 and a second touch electrode 221 are arranged in a hetero-layered manner, and the second connecting portion 222 is configured to implement connection between two second touch electrodes 221. For example, the second connecting portion 222 may include two arc-shaped connecting lines arranged in parallel, one end of each arc-shaped connecting line being connected with one second touch electrode 221 and the other end being connected with the other second touch electrode 221.

In some exemplary implementation modes, as shown in FIG. 3, the touch peripheral region 201 is located around the touch region 200. The touch peripheral region 201 includes four first touch peripheral regions and four second touch peripheral regions. A region where each first touch peripheral region is overlapped with the planar region A1 is located at a corner region of the planar region A1. The four second touch peripheral regions are located at edges of the four bent regions away from the planar region A1 respectively. Multiple lead connecting lines are provided in at least one first touch peripheral region. Multiple touch leads are provided in at least one second touch peripheral region. The multiple touch leads include at least one of: multiple first touch leads and multiple second touch leads. For example, the first touch leads are sensing leads and the second touch leads are drive leads; or the first touch leads are drive leads and the second touch leads are sensing leads. However, this embodiment is not limited thereto.

In some exemplary implementation modes, as shown in FIG. 5, first touch units 210 in each row are connected with one first touch lead 401, and second touch units 220 in each column are connected with one second touch lead 402. The first touch lead 401 and the second touch lead 402 may be connected with a touch chip on a flexible circuit board through a bonding region located on one side of the touch region. For example, the first touch lead is a sensing lead, the second touch lead is a drive lead, the touch chip may input driving drive scan signal to the second touch units through the drive lead, and the first touch units may output sensing signals to the touch chip through the sensing lead. However, this embodiment is not limited thereto. For example, the first touch lead may be a drive lead and the second touch lead may be a sensing lead.

In some exemplary implementation modes, as shown in FIG. 5, first touch units 210 in an upper half region of the touch region are connected with a first touch lead 401 in a second touch peripheral region located on a left side of the touch region, and first touch units 210 in a lower half region of the touch region are connected with a first touch lead 401 in a second touch peripheral region located on a right side of the touch region. Second touch units 220 in the touch region are connected with a second touch lead 402 located in a second touch peripheral region on a lower side of the touch region. In some embodiments, the first touch units 210 in the upper half region of the touch region may be connected with the first touch lead 401 in the second touch peripheral region located on the right side of the touch region, and the first touch units 210 in the lower half region of the touch region may be connected with the first touch lead 401 in the second touch peripheral region located on the left side of the touch region. The second touch units 220 in the touch region are connected with the second touch lead 402 in the second touch peripheral region located on the lower side of the touch region. A 1T1R drive mode is used in the touch panel according to the exemplary embodiment. However, this embodiment is not limited thereto. In some examples, for touch regions with width-to-length ratios of 18:9 and 20:9, a 2T1R drive mode may be used, that is, drive signals are provided simultaneously through drive leads at both a top end and a bottom end (e.g., a second direction), and a receiving signal is provided through a single-sided sensing lead on a left side or a right side (e.g., a first direction). In some examples, for a touch region with a width-length ratio of 8:9, e.g., a foldable screen, a 2T2R drive mode may be used, that is, drive signals are provided simultaneously through drive leads at both a top end and a bottom end (e.g., a second direction), and receiving signals are provided simultaneously through sensing leads at both a left side and a right side (e.g., a first direction).

Figure 7:
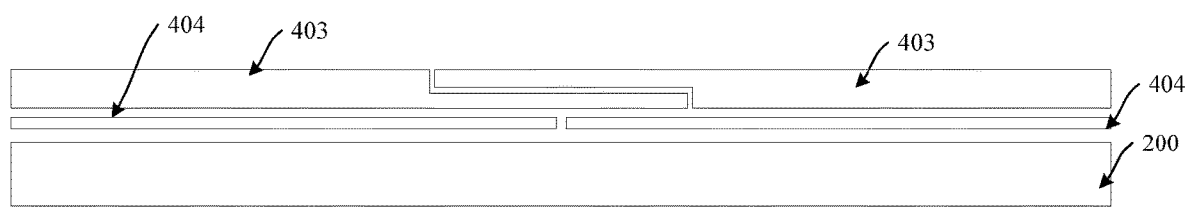
FIG. 7 is a schematic partial view of a touch panel according to at least one embodiment of the present disclosure.

FIG. 7 is a schematic partial view of a touch panel according to at least one embodiment of the present disclosure. FIG. 7 is a schematic partial view of the second bent region B2 in FIG. 4. In some exemplary implementation modes, at least one ground (GND) line 403 and at least one first shielding (Guard) line 404 are also provided in a second touch peripheral region around the touch region. The first shielding line 404, for example, may be connected with a ground signal to implement a shielding function. The ground line 403 may be used for implementing shielding and Electro-Static Discharge (ESD) functions. The first shielding line 404 and the ground line 403 may be respectively connected with bonding pins provided in the bonding region to receive external signals. As shown in FIG. 7, first shielding lines 404 on left and right sides are disconnected and ground lines 403 on the left and right sides are disconnected. The first shielding lines 404 on the left and right sides receive same signals through the bonding pins in the bonding region, and the ground line 403 on the left and right sides receive same signals through the bonding pins in the bonding region. The ground line 403 is located on one side of the first shielding line 404 away from the touch region 200. However, this embodiment is not limited thereto.

In some exemplary implementation modes, taking the 1T1R drive mode used in the touch panel as an example, as shown in FIGS. 2 to 4, a first shielding connecting line, a ground connecting line, and multiple lead connecting lines are arranged in the first touch peripheral region located around the first notch C1. The first shielding connecting line is configured to connect first shielding lines in the second touch peripheral regions located on an upper side and a left side of the planar region A1, the ground connecting line is configured to connect ground lines in the second touch peripheral regions located on the upper side and the left side of the planar region A1, and at least one of the multiple lead connecting lines is configured to connect first touch units located in an upper left corner region of the planar region A1 and first touch leads in the second touch peripheral region on the left side of the planar region A1, or connect first touch units in the second bent region B2 and first touch leads in the second touch peripheral region on the left side of the planar region A1. In the first touch peripheral region around the first notch C1, the first shielding connecting line may be located on one side of the ground connecting line close to the touch region, and the multiple lead connecting lines are located on one side of the first shielding connecting line close to the touch region. However, this embodiment is not limited thereto.

In some examples, as shown in FIGS. 2 to 4, a first shielding connecting line and a ground connecting line are arranged in the first touch peripheral region located around the second notch C2. The first shielding connecting line in a region around the second notch C2 is configured to connect first shielding lines in the second touch peripheral regions located on an upper side and a right side of the planar region A1, and the ground connecting line is configured to connect ground lines in the second touch peripheral regions located on the upper side and the right side of the planar region A1. In the first touch peripheral region around the second notch C2, the first shielding connecting line may be located on one side of the ground connecting line close to the touch region. However, this embodiment is not limited thereto.

In some examples, as shown in FIGS. 2 to 4, a first shielding connecting line, a second shielding connecting line, a ground connecting line, and multiple lead connecting lines are arranged in the first touch peripheral region located around the fourth notch C4. The first shielding connecting line in a region around the fourth notch C4 is configured to connect first shielding lines in second touch peripheral regions located on a left side and a lower side of the planar region A1, the second shielding connecting line is configured to connect second shielding lines in the second touch peripheral regions located on the left side and the lower side of the planar region A1, and the ground connecting line is configured to connect ground lines in the second touch peripheral regions located on the left side and the lower side of the planar region A1. At least one of the multiple lead connecting lines in a region around the fourth notch C4 is configured to connect first touch leads in the second touch peripheral regions on the left side and the lower side of the planar region A1, or connect second touch units in a lower left corner region of the planar region A1 and second touch leads in the second touch peripheral region on the lower side of the planar region A1. In the first touch peripheral region around the fourth notch C4, the second shielding connecting line may be located between a lead connecting line connecting first touch leads and a lead connecting line connecting second touch leads, the first shielding connecting line may be located between the ground connecting line and the lead connecting lines, and the ground connecting line may be located on one side of the first shielding connecting line away from the touch region. However, this embodiment is not limited thereto.

In some examples, as shown in FIGS. 2 to 4, a first shielding connecting line, a second shielding connecting line, a ground connecting line, and multiple lead connecting lines are arranged in the first touch peripheral region located around the third notch C3. The first shielding connecting line in a region around the third notch C3 is configured to connect first shielding lines in the second touch peripheral regions located on a right side and a lower side of the planar region A1, the second shielding connecting line is configured to connect second shielding lines in the second touch peripheral regions located on the right side and the lower side of the planar region A1, and the ground connecting line is configured to connect ground lines located on the right side and the lower side of the planar region A1. At least one of the multiple lead connecting lines in the region around the third notch C3 is configured to connect first touch leads in the second touch peripheral regions on the right side and the lower side of the planar region A1, or connect a first touch unit in a lower right corner region of the planar region A1 and a first touch lead in the second touch peripheral region on the lower side of the planar region A1, or connect a second touch unit in the lower right corner region of the planar region A1 and a second touch lead in the second touch peripheral region on the lower side of the planar region A1. In the first touch peripheral region around the third notch C3, the second shielding connecting line is located between a lead connecting line connecting a first touch lead and a lead connecting line connecting a second touch lead, the first shielding connecting line is located between a ground connecting line and the lead connecting line, and the ground connecting line may be located on one side of the first shielding connecting line away from the touch region. However, this embodiment is not limited thereto.

Figure 8:
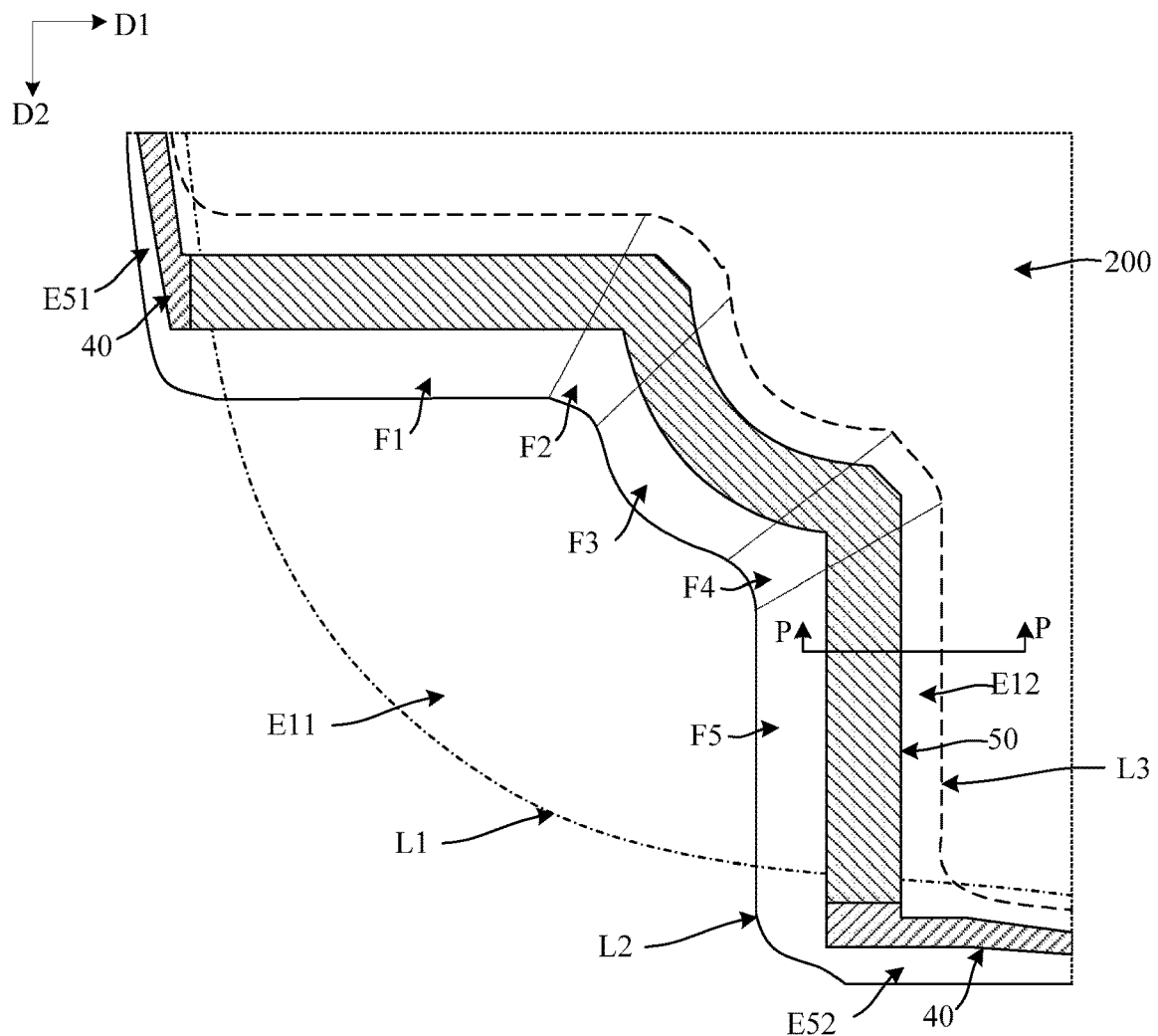
FIG. 8 is a schematic partial enlarged view of a region 51 in FIG. 3.
Figure 9:
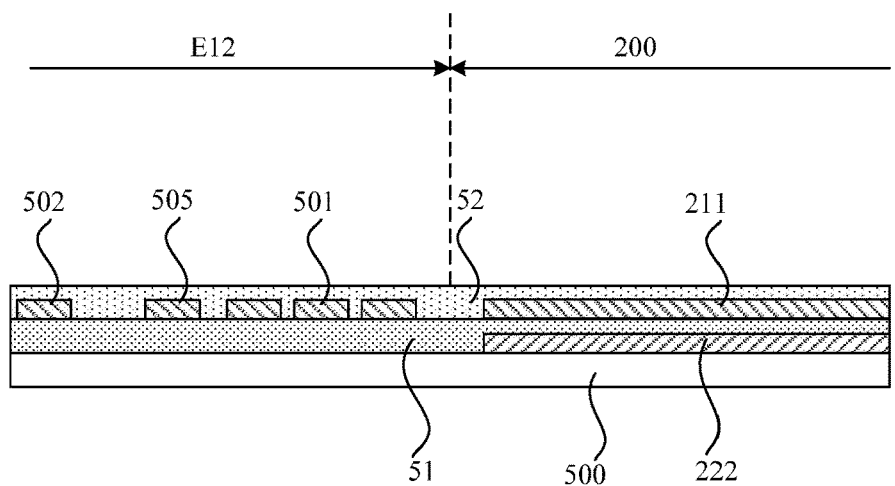
FIG. 9 is a schematic partial sectional view taken along a direction P-P in FIG. 8.
Figure 10:
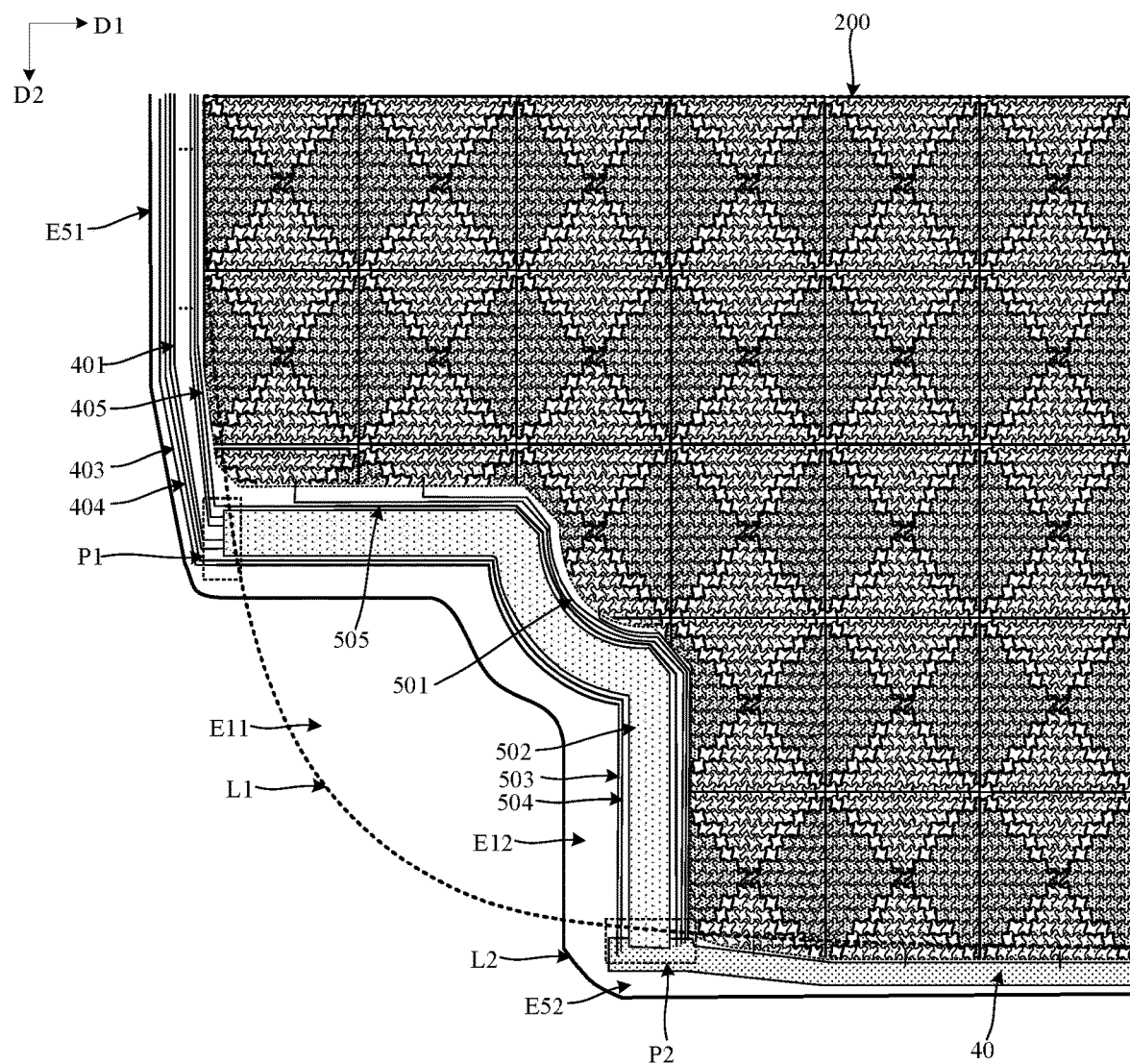
FIG. 10 is a schematic partial enlarged view of the region 51 in FIG. 3.
Figure 11:
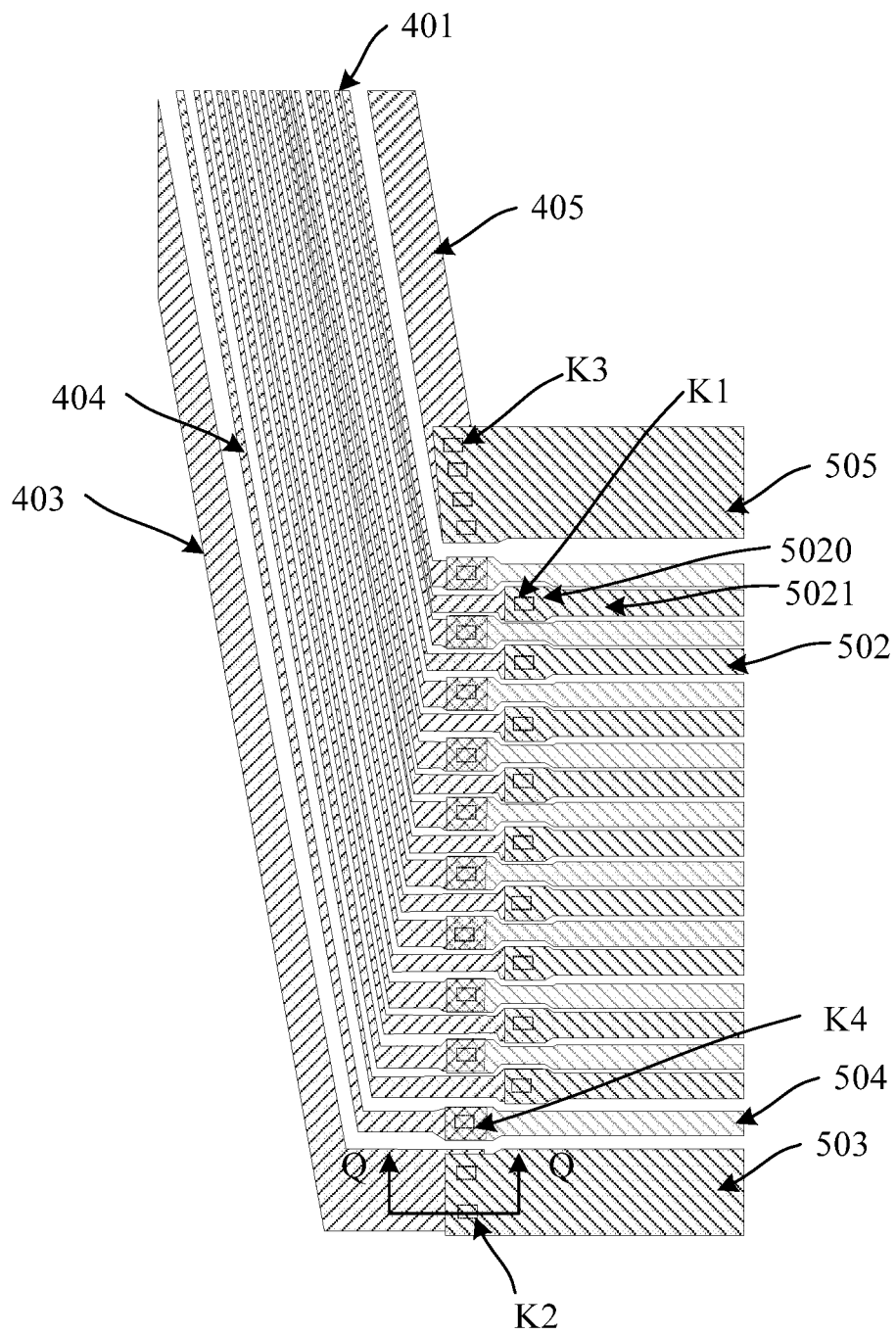
FIG. 11 is a schematic partial enlarged view of a region P1 in FIG. 10.
Figure 12:
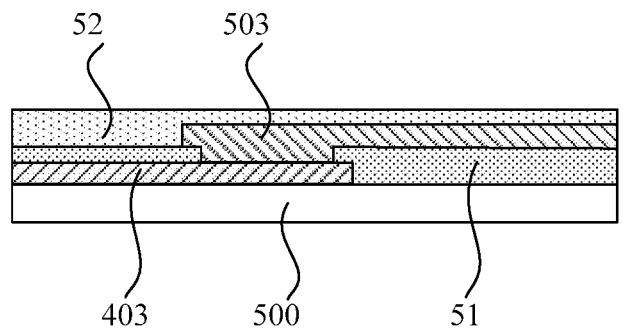
FIG. 12 is a schematic partial sectional view taken along a direction Q-Q in FIG. 11.
Figure 13:
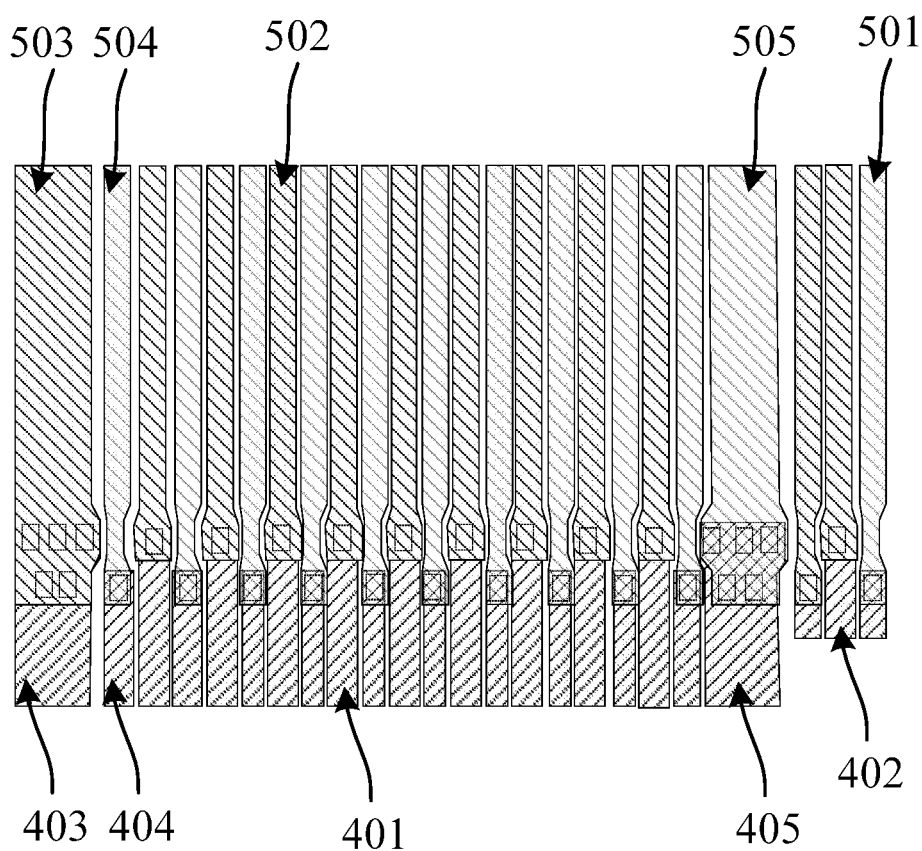
FIG. 13 is a schematic partial enlarged view of a region P2 in FIG. 10.
Figure 14:
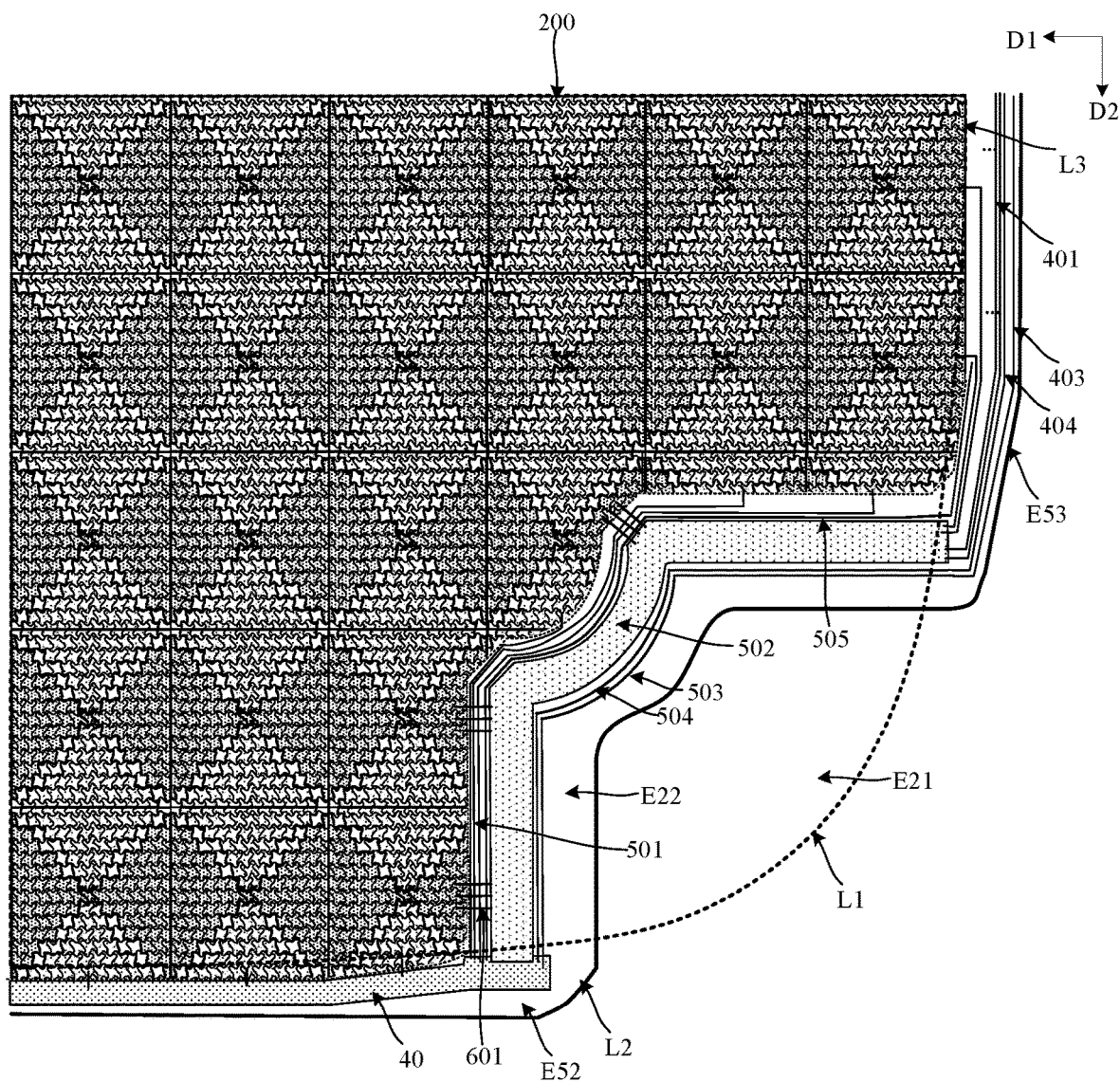
FIG. 14 is a schematic partial enlarged view of a region S2 in FIG. 3.
Figure 15:
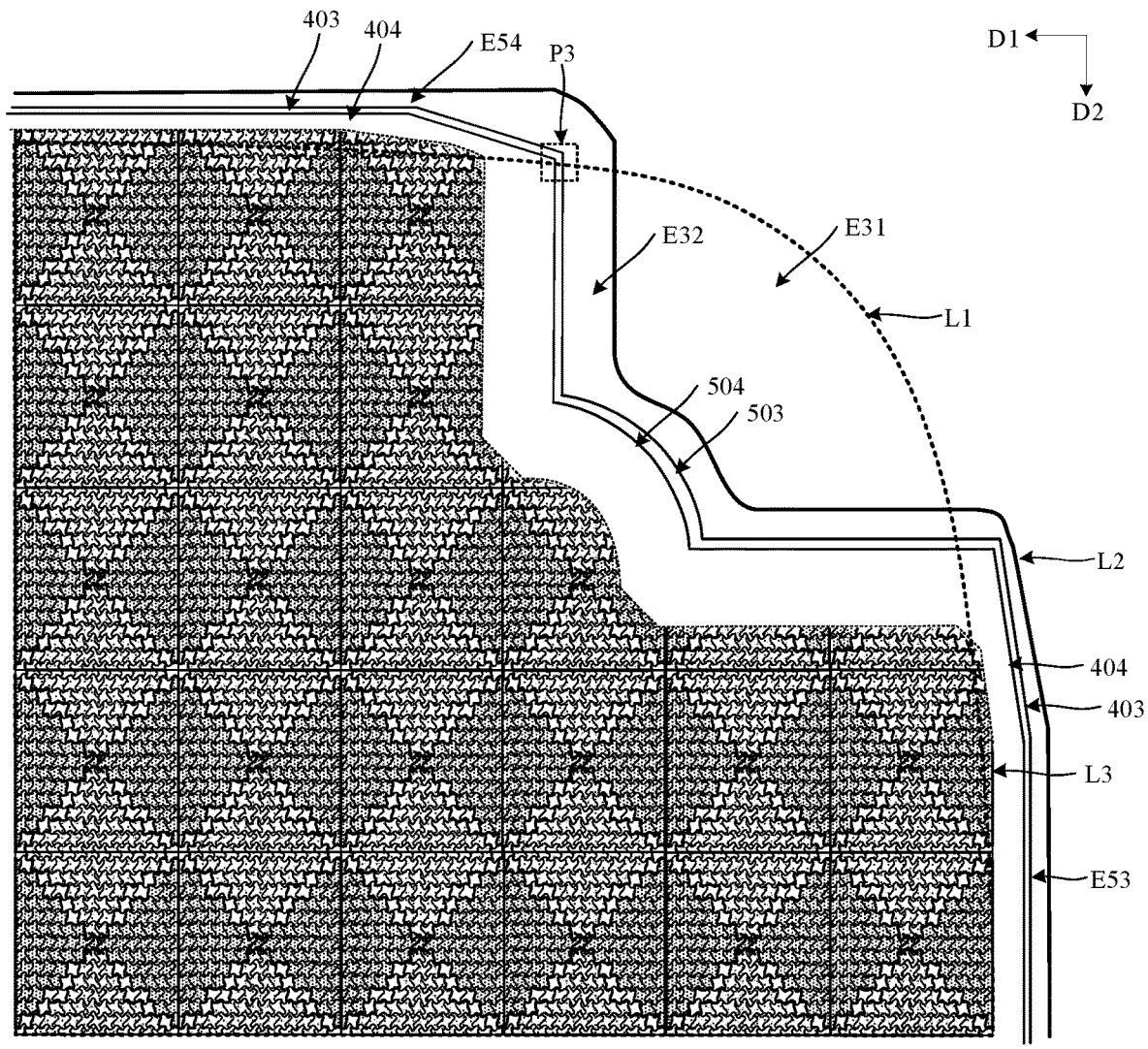
FIG. 15 is a schematic partial enlarged view of a region S3 in FIG. 3.
Figure 16:
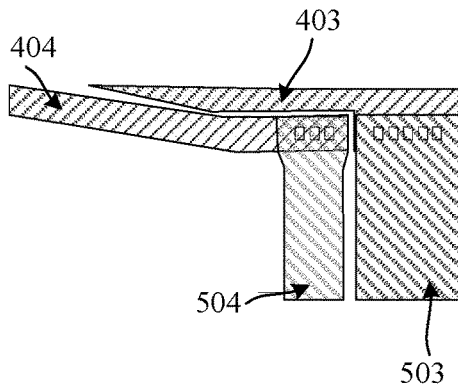
FIG. 16 is a schematic partial enlarged view of a region P3 in FIG. 15.
Figure 17:
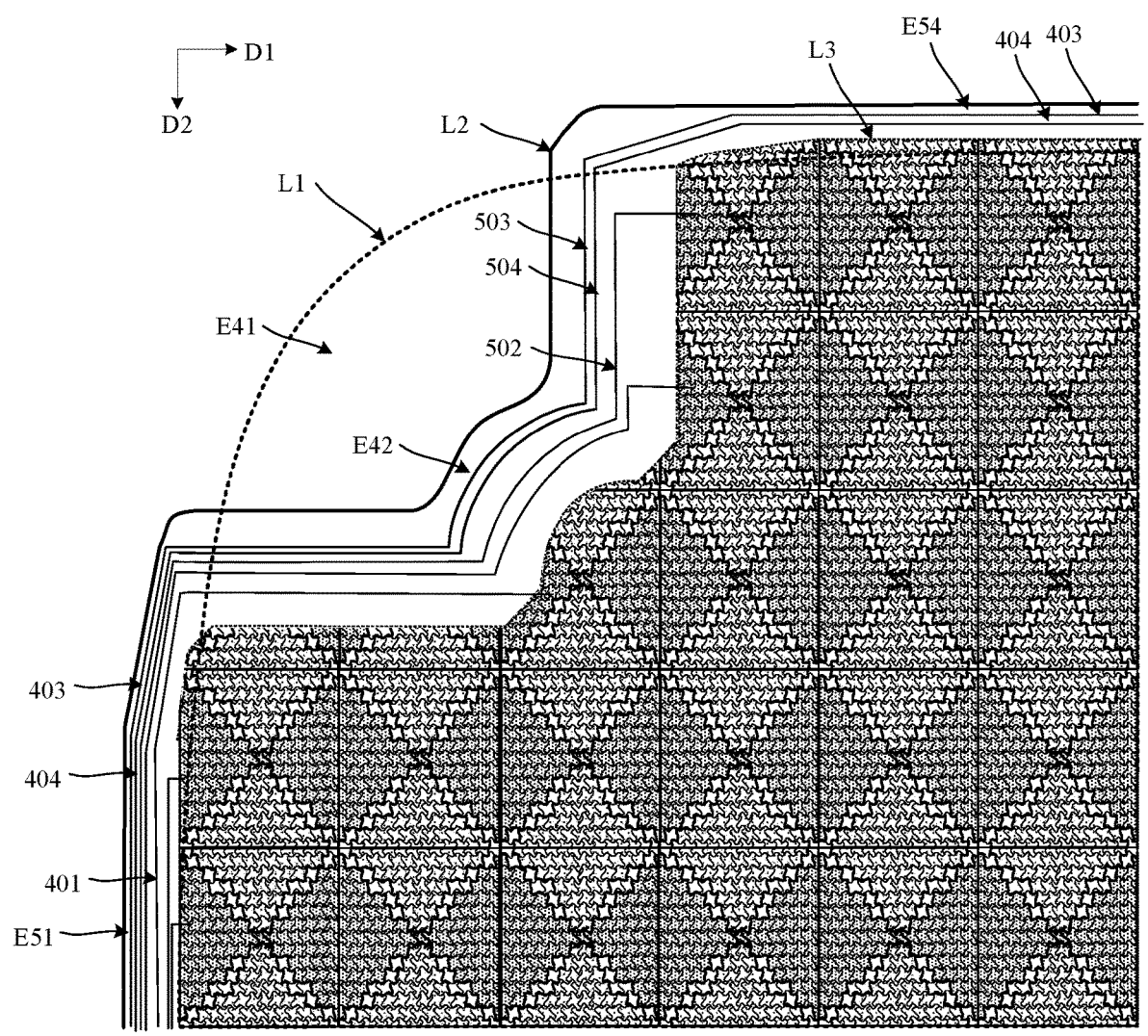
FIG. 17 is a schematic partial enlarged view of a region S4 in FIG. 3.

Taking a drive mode of the touch panel being 1T1R as an example, traces at the four corner positions of the touch panel are illustrated by way of example. Both FIG. 8 and FIG. 10 are schematic partial enlarged views of a region S1 in FIG. 3, that is, both FIG. 8 and FIG. 10 are schematic partial enlarged views of a lower left corner position of the touch panel 2. FIG. 9 is a schematic partial sectional view taken along a direction P-P in FIG. 8. FIG. 11 is a schematic partial enlarged view of a region P1 in FIG. 10. FIG. 12 is a schematic partial sectional view taken along a direction Q-Q in FIG. 11. FIG. 13 is a schematic partial enlarged view of a region P2 in FIG. 10. FIG. 14 is a schematic partial enlarged view of a region S2 in FIG. 3, that is, FIG. 14 is a schematic partial enlarged view of a lower right corner position of the touch panel 2. FIG. 15 is a schematic partial enlarged view of a region S3 in FIG. 3, that is, FIG. 15 is a schematic partial enlarged view of an upper right corner position of the touch panel 2. FIG. 16 is a schematic partial enlarged view of a region P3 in FIG. 15. FIG. 17 is a schematic partial enlarged view of a region S4 in FIG. 3, that is, FIG. 17 is a schematic partial enlarged view of an upper left corner position of the touch panel 2.

In FIGS. 8, 10, 14, 15, and 17, a line L1 represents a boundary of the display region 100 of the display panel 1, a line L2 represents a boundary of the touch panel 2, and a line L3 represents a boundary of the touch region 200 of the touch panel 2.

In some exemplary implementation modes, as shown in FIGS. 8 and 10, a region E11 between the line L1 and the line L2 corresponds to a position of the fourth notch C4 of the touch panel 2. On one side of the region E11 close to the touch region 200, a region surrounded by lines L1, L2, and L3 is a first touch peripheral region E12 at the lower right corner position of the touch panel 2. On one side of the first touch peripheral region E12 away from the touch region 200, a region surrounded by the lines L1, L2, and L3 is a second touch peripheral region E51 on a left side of the touch panel 2 and a second touch peripheral region E52 on a lower side of the touch panel 2. The first touch peripheral region E12 is overlapped with the display region 100, and a light-transmitting first trace layer 50 is provided in the first touch peripheral region E12 to avoid an influence on a display effect of the display region 100. The second touch peripheral region E51 and the second touch peripheral region E52 are not overlapped with the display region 100, and a non-light transmitting second trace layer 40 may be provided in the second touch peripheral region E51 and the second touch peripheral region E52. In some examples, a position in which the light-transmitting first trace layer 50 is connected with the non-light-transmitting second trace layer 40 may be located at a boundary of the second touch peripheral region E51 (or the second touch peripheral region E52) close to the first touch peripheral region E12 to ensure that the first touch peripheral region E12 is a transparent visible region. For example, the light-transmitting first trace layer 50 may extend from the first touch peripheral region E12 to the second touch peripheral region E51, and implement a connection with the non-light-transmitting second trace layer 40 in the second touch peripheral region E51; the first trace layer 50 may extend from the first touch peripheral region E12 to the second touch peripheral region E52, and implement a connection with the non-light transmitting second trace layer 40 in the second touch peripheral region E52.

In some exemplary implementation modes, as shown in FIG. 8, the first touch peripheral region E12 may include: a first sub-region F1, a second sub-region F2, a third sub-region F3, a fourth sub-region F4, and a fifth sub-region F5 connected sequentially. Traces in the first sub-region F1 and the fifth sub-region F5 may be straight line segments, and traces in the second sub-region F2 and the fourth sub-region F4 may be curve segments, a combination of straight line segments, or a combination of a curve segment and a straight line segment. Traces in the third sub-region F3 may be circular arc segments. In some examples, an edge of a notch located at a periphery of the first touch peripheral region E12 is formed by a first straight line segment, a first transition segment, a circular arc segment, a second transition segment, and a second straight line segment connected sequentially. The first straight line segment is an edge of the first sub-region F1, the first transition segment is an edge of the second sub-region F2, the circular arc segment is an edge of the third sub-region F3, the second transition segment is an edge of the fourth sub-region F4, and the second straight line segment is an edge of the fifth sub-region F5. In some examples, the first transition segment connects the first straight line segment and the circular arc segment, and the first transition segment is a circular arc line, a corresponding radius of which is about 0.5 mm to 0.9 mm, for example, about 0.7 mm. The second transition segment connects the second direct line and the circular arc segment, and the second transition segment is a circular arc line, a corresponding radius of which is about 0.5 mm to 0.9 mm, for example, about 0.7 mm. The circular arc segment is connected between the first transition segment and the second transition segment and its corresponding radius is about 3 mm to 4 mm, for example, about 3.6 mm. However, this embodiment is not limited thereto.

As shown in FIG. 3, any of the bent regions has a boundary line that bends along the planar region, which is defined as a bending line.

As shown in FIG. 8, in some embodiments, an extension line of a bending line has any intersection point with an edge of the notch. In some embodiments, the extension line of the bending line has an intersection point with a straight line segment of the notch. In some embodiments, the extension line of the bending line has an intersection point with a circular arc segment of the notch. In some embodiments, the extension line of the bending line has an intersection point with a transition segment of the notch. In some embodiments, the intersection point of the extension line of the bending line and the notch is at a position of a point where the straight line segment changes, and may be a change point of the straight line segment and the circular arc segment, i.e., a connection point, or a change point of the straight line segment and the transition segment, i.e., a connection point. In some embodiments, the bending line may be a straight line parallel to an edge where the display panel at a bent side is located and may be have an angle. In some embodiments, an angle of intersection of extension lines of adjacent bending lines may be 90 degrees or any other angles. In some embodiments, an intersection point of the extension lines of the adjacent bending lines is located in the first touch peripheral region E12.

In some embodiments, the extension line of the bending line passes through at least one portion of the first touch peripheral region E12. In some embodiments, the extension line of the bending line passes through the first sub-region F1 of the first touch peripheral region E12. In some embodiments, the extension line of the bending line passes through the second sub-region F2 of the first touch peripheral region E12. In some embodiments, the extension line of the bending line passes through the third sub-region F3 of the first touch peripheral region E12. In some embodiments, the extension line of the bending line passes through the fourth sub-region F4 of the first touch peripheral region E12. In some embodiments, the extension line of the bending line passes through the fifth sub-region F5 of the first touch peripheral region E12.

In some embodiments, the extension line of the bending line intersects at least one portion of traces of the first trace layer 50.

In some exemplary implementation modes, as shown in FIG. 10, a shape of a touch electrode at a position of an edge of the touch region 200 may match a shape of the edge of the touch region 200. For example, the touch electrode at the position of the edge may have a circular arc-shaped edge, or may be polygonal. However, this embodiment is not limited thereto.

In some exemplary implementation modes, as shown in FIGS. 10 to 13, a first trace layer 50 in the first touch peripheral region E12 includes multiple first lead connecting lines 501, multiple second lead connecting lines 502, at least one ground connecting line 503, at least one first shielding connecting line 504, and at least one second shielding connecting line 505. A second trace layer 40 in the second touch peripheral region E51 includes multiple first touch leads 401, at least one ground line 403, at least one first shielding line 404, and at least one second shielding line 405. A second trace layer 40 in the second touch peripheral region E52 includes multiple first touch leads 401, multiple second touch leads 402, at least one ground line 403, at least one first shielding line 404, and at least one second shielding line 405. In some examples, the ground line 403, the first shielding line 404, and the second shielding line 405 in the second touch peripheral region E52 may respectively extend to be connected with the bonding pins in the bonding region to receive external signals, for example, each of them receives a ground signal. In some examples, the ground line 403 may, through lap of the ground connecting line 503, extend from the second touch peripheral region E52 through the first touch peripheral region E12, the second touch peripheral region E51, and a first touch peripheral region E42, to a second touch peripheral region E54, and extend from the second touch peripheral region E52 through a first touch peripheral region E22, a second touch peripheral region E53, and a first touch peripheral region E32, to the second touch peripheral region E54. The first shielding line 404 may, through lap of the first shielding connecting line 504, extend from the second touch peripheral region E52 through the first touch peripheral region E12, the second touch peripheral region E51, and the first touch peripheral region E42, to the second touch peripheral region E54, and extend from the second touch peripheral region E52 through the first touch peripheral region E22, the second touch peripheral region E53, and the first touch peripheral region E32, to the second touch peripheral region E54. The second shielding line 405 may, through the second shielding connecting line 505, extend from the second touch peripheral region E52 through the first touch peripheral region E12 to the second touch peripheral region E51, and extend from the second touch peripheral region E52 through the first touch peripheral region E22 to the second touch peripheral region E53. However, this embodiment is not limited thereto.

In some exemplary implementation modes, as shown in FIGS. 10 to 13, the multiple first lead connecting lines 501 are configured to connect second touch units (for example, including a second touch unit in the first bent region B1 and a second touch unit in a corner region A14 of the planar region A1) at a lower left corner position of the touch panel 2 and a second touch lead 402 in the second touch peripheral region E52 on a lower side of the planar region A1. The multiple second lead connecting lines 502 are configured to connect first touch leads 401 in the second touch peripheral region E51 on a left side of the planar region A1 and first touch leads 401 in the second touch peripheral region E52 on a lower side of the planar region A1. The ground connecting line 503 is configured to connect ground lines 403 in the second touch peripheral region E51 on a left side of the planar region A1 and in the second touch peripheral region E52 on a lower side of the planar region A1. The first shielding connecting line 504 is configured to connect first shielding lines 404 in the second touch peripheral region E51 on a left side of the planar region A1 and in the second touch peripheral region E52 on a lower side of the planar region A1. The second shielding connecting line 505 is configured to connect second shielding lines 405 in the second touch peripheral region E51 on a left side of the planar region A1 and in the second touch peripheral region E52 on a lower side of the planar region A1. A portion of second touch leads 402 in the second touch peripheral region E52 may be connected with second touch electrodes 221 in the fourth bent region B4. In FIG. 10, only several first lead connecting lines 501 are illustrated, of the multiple second lead connecting lines 502 are illustrated as a whole, and of the multiple first touch leads, of the multiple second touch leads, the ground line, the first shielding line, and the second shielding line in the second touch peripheral region E52 are illustrated as a whole. However, this embodiment is not limited thereto.

In this exemplary embodiment, interferences between adjacent touch signal lines and lead connecting lines may be shielded by providing a second shielding line between a first touch signal line and a second touch signal line and providing a second shielding connecting line between a first lead connecting line and a second lead connecting line. Interferences of external signals may be shielded by providing a first shielding line on one side of a touch signal line away from the touch region and providing a first shielding connecting line on one side of a lead connecting line away from the touch region.

In some exemplary implementation modes, as shown in FIG. 10, extension directions of the ground connecting line 503, the first shielding connecting line 504, the second shielding connecting line 505, the multiple first lead connecting lines 501, and the multiple second lead connecting lines 502 in the first touch peripheral region E12 match a shape of a boundary (e.g., a line L3) of the touch region 200 of the touch panel 2. In some examples, at least one of the second lead connecting lines 502 may be formed by connecting a first straight line segment, a first transition line segment, a curve segment, a second transition line segment, and a second straight line segment, the first straight line segment being parallel to a first direction D1 and the second straight line segment being parallel to a second direction D2. A first straight line segment of a second lead connecting line 502 is connected with a first touch lead 401 in the second touch peripheral region E51 on a left side of the touch region 200, and a second straight line segment is connected with a first touch lead 401 in the second touch peripheral region E52 on a lower side of the touch region 200. However, this embodiment is not limited thereto. For example, at least one of the first lead connecting lines or the second lead connecting lines may be a polyline formed by connecting multiple straight line segments.

In some exemplary implementation modes, as shown in FIG. 10, in the first touch peripheral region E12, the multiple first lead connecting lines 501, the second shielding connecting line 505, the multiple second lead connecting lines 502, the first shielding connecting line 504, and the ground connecting line 503 are sequentially arranged along a direction away from the touch region 200. Pitches between adjacent first lead connecting lines 501 may be the same and pitches between adjacent second lead connecting lines 502 may be the same. The second shielding connecting line 505 is provided between a first lead connecting line 501 and a second lead connecting line 502. There is a first pitch between the second shielding connecting line 505 and an adjacent second lead connecting line 502, and there is a second pitch between a second lead connecting line 502 and an adjacent first shielding connecting line 504. The first pitch may be greater than a pitch between adjacent first lead connecting lines 501 and may be greater than a pitch between adjacent second lead connecting lines 502 as well. The second pitch may be greater than the pitch between the adjacent first lead connecting lines 501 and may be greater than the pitch between the adjacent second lead connecting lines 502 as well. In some examples, the first pitch may be greater than or equal to the second pitch. However, this embodiment is not limited thereto.

In some exemplary implementation modes, as shown in FIGS. 10 to 13, a width of the ground connecting line 503 may be greater than a width of a first lead connecting line 501 and be greater than a width of a second lead connecting line 502 as well. A width of the second shielding connecting line 505 may be greater than a width of the ground connecting line 503. A width of the first shielding connecting line 504 may be less than the width of the ground connecting line 503. However, this embodiment is not limited thereto.

In some exemplary implementation modes, as shown in FIG. 14, a region E21 between lines L1 and L2 corresponds to a position of the third notch C3 of the touch panel 2. On one side of the region E21 close to the touch region 200, a region surrounded by lines L1, L2, and L3 is the first touch peripheral region E22 at the lower right corner position of the touch panel 2. On one side of the first touch peripheral region E22 away from the touch region 200, a region surrounded by the lines L1, L2, and L3 is the second touch peripheral region E53 on a right side and the second touch peripheral region E52 on a lower side of the touch panel 2. The first touch peripheral region E22 is overlapped with the display region 100, and a light-transmitting first trace layer 50 is provided in the first touch peripheral region E22. The first trace layer 50 includes multiple first lead connecting lines 501, multiple second lead connecting lines 502, at least one ground connecting line 503, at least one first shielding connecting line 504, and at least one second shielding connecting line 505. A non-light transmitting second trace layer 40 in the second touch peripheral region E53 includes multiple first touch leads 401, at least one ground line 403, at least one first shielding line 404, and at least one second shielding line 405. A second trace layer 40 in the second touch peripheral region E52 includes multiple first touch leads 401, multiple second touch leads 402, at least one ground line 403, at least one first shielding line 404, and at least one second shielding line 405. In the first touch peripheral region E22, the second shielding connecting line 505 is located between the multiple first lead connecting lines 501 and the multiple second lead connecting lines 502, the first shielding connecting line 504 is located on one side of the multiple second lead connecting lines 502 away from the touch region 200, and the ground connecting line 503 is located on one side of the first shielding connecting line 504 away from the touch region 200.

In some exemplary implementation modes, as shown in FIG. 14, the multiple first lead connecting lines 501 in the first touch peripheral region E22 are configured to connect second touch units (for example, including a second touch unit in the third bent region B3 and a second touch unit in the corner region A13 of the planar region A1) at the lower right corner position of the touch panel 2 and second touch leads 402 in the second touch peripheral region E52 on a lower side of the planar region A1. The multiple second lead connecting lines 502 in the first touch peripheral region E22 are configured to connect first touch leads 401 in the second touch peripheral region E53 on a right side of the planar region A1 and first touch leads 401 in the second touch peripheral region E52 on a lower side of the planar region A1, and first touch units (for example, including a first touch unit in the fourth bent region B4 and a first touch unit in the corner region A13 of the planar region A1) at the lower right corner position of the touch panel 2 and first touch leads 401 in the second touch peripheral region E52 on a lower side of the planar region A1. The ground connecting line 503 is configured to connect ground lines 403 in the second touch peripheral region E53 on a right side of the planar region A1 and in the second touch peripheral region E52 on a lower side of the planar region A1. The first shielding connecting line 504 is configured to connect first shielding lines 404 in the second touch peripheral region E53 on a right side of the planar region A1 and in the second touch peripheral region E52 on a lower side of the planar region A1. The second shielding connecting line 505 is configured to connect second shielding lines 405 in the second touch peripheral region E53 on a right side of the planar region A1 and in the second touch peripheral region E52 on a lower side of the planar region A1. A portion of second touch leads 402 in the second touch peripheral region E52 may be connected with second touch electrodes 221 in the fourth bent region B4. In FIG. 14, only several first lead connecting lines 501 are illustrated, the multiple second lead connecting lines 502 are illustrated as a whole, and the multiple first touch leads, the multiple second touch leads, the ground line, the first shielding line, and the second shielding line in the second touch peripheral region E52 are illustrated as a whole. However, this embodiment is not limited thereto.

In some exemplary implementation modes, as shown in FIG. 14, the second lead connecting lines 502 in the first touch peripheral region E22 may be connected with first touch units at the lower right corner position of the touch panel 2 through at least one first lap line 601. In some examples, the first trace layer and the touch layer are disposed on a same layer, the bridging layer is located on one side of the first trace layer close to a touch base substrate, and the first lap line 601 and the bridging layer may be disposed on a same layer or the first lap line 601 may be located on one side of the touch layer away from the touch base substrate. For example, one end of the first lap line 601 may be connected with a first touch electrode of a first touch unit at the lower right corner position of the touch panel 2 through a via, and the other end may be connected with a second lead connecting line 502 through a via. However, this embodiment is not limited thereto. In this exemplary implementation mode, an electrical connection between the second lead connecting line 502 and the first touch unit may be implemented across the first lead connecting lines 501 through the first lap line 601. In some examples, when first touch leads in a lower half region of the touch region are led out from a left side, the first lap line may be arranged at the lower left corner position of the touch panel to implement an electrical connection between the first touch unit and the second lead line.

In some exemplary implementation modes, as shown in FIG. 15, a region E31 between lines L1 and L2 corresponds to a position where the second notch C2 of the touch panel 2 is located. On one side of the region E31 close to the touch region 200, a region surrounded by lines L1, L2, and L3 is the first touch peripheral region E32 at the upper right corner position of the touch panel 2. On one side of the first touch peripheral region E32 away from the touch region 200, a region surrounded by the lines L1, L2, and L3 is the second touch peripheral region E53 on a right side and the second touch peripheral region E54 on an upper side of the touch panel 2. The first touch peripheral region E32 is overlapped with the display region 100, and a light-transmitting first trace layer 50 is provided in the first touch peripheral region E32. The first trace layer 50 includes at least one ground connecting line 503 and at least one first shielding connecting line 504. A non-light transmitting second trace layer 40 in the second touch peripheral region E53 includes at least one ground line 403 and at least one first shielding line 404. A second trace layer 40 in the second touch peripheral region E54 includes at least one first shielding line 404 and at least one ground line 403. The first shielding line 404 is located on one side of the ground line 403 close to the touch region. The first shielding connecting line 504 is located on one side of the ground connecting line 503 close to the touch region.

In some exemplary implementation modes, as shown in FIG. 15, the first shielding connecting line 504 is configured to connect first shielding lines 404 in the second touch peripheral region E54 on an upper side of the planar region A1 and in the second touch peripheral region E53 on a right side of the planar region A1. The ground connecting line 503 is configured to connect ground lines 403 in the second touch peripheral region E54 on an upper side of the planar region A1 and in the second touch peripheral region E53 on a right side of the planar region A1. However, this embodiment is not limited thereto.

In some exemplary implementation modes, as shown in FIG. 16, the ground connecting line 503 in the first touch peripheral region E32 may be connected with a ground line 403 in an adjacent second touch peripheral region through multiple vias, and the first shielding connecting line 504 may be connected with a first shielding line 404 in an adjacent second touch peripheral region through multiple vias. However, this embodiment is not limited thereto.

In some exemplary implementation modes, as shown in FIG. 17, a region E41 between lines L1 and L2 corresponds to a position where the first notch C1 of the touch panel 2 is located. On one side of the region E41 close to the touch region 200, a region surrounded by lines L1, L2, and L3 is the first touch peripheral region E42 at the upper left corner position of the touch panel 2. On one side of the first touch peripheral region E42 away from the touch region 200, a region surrounded by the lines L1, L2, and L3 is the second touch peripheral region E51 on a left side and the second touch peripheral region E54 on an upper side of the touch panel 2. The first touch peripheral region E42 is overlapped with the display region 100, and a light-transmitting first trace layer 50 is provided in the first touch peripheral region E42. The first trace layer 50 includes at least one ground connecting line 503, at least one first shielding connecting line 504 and multiple second lead connecting lines 502. The first shielding connecting line 504 is located on one side of the multiple second lead connecting lines 502 away from the touch region, and the ground connecting line 503 is located on one side of the first shielding connecting line 504 away from the touch region. A non-light transmitting second trace layer 40 in the second touch peripheral region E51 includes multiple first touch leads 401, at least one ground line 403, and at least one first shielding line 404. A second trace layer 40 in the second touch peripheral region E54 includes at least one ground line 403 and at least one first shielding line 404.

In some exemplary implementation modes, as shown in FIG. 17, the first shielding connecting line 504 in the first touch peripheral region E42 is configured to connect first shielding lines 404 in the second touch peripheral region E54 on an upper side of the planar region A1 and in the second touch peripheral region E51 on a left side of the planar region A1. The ground connecting line 503 is configured to connect ground lines 403 in the second touch peripheral region E54 on an upper side of the planar region A1 and in the second touch peripheral region E51 on a left side of the planar region A1. The multiple second lead connecting lines 502 in the first touch peripheral region E42 are configured to connect a first touch unit (for example, including a first touch unit in the second bent region B2 and a first touch unit in the corner region A11 of the planar region A1) at the upper left corner position of the touch panel 2 and a first touch lead 401 in the second touch peripheral region E51 on a left side of the planar region A1. A portion of first touch leads 401 in the second touch peripheral region E51 may be connected with first touch electrodes 211 in the first bent region B1. Only several second lead connecting lines 502 in the first touch peripheral region E42 are illustrated in FIG. 17. A connecting manner between a first trace layer 50 in the first touch peripheral region E42 and a second trace layer 40 in an adjacent second touch peripheral region may be referred to a connecting manner between a first trace layer in the first touch peripheral region E32 and a second trace layer in an adjacent second touch peripheral region, and thus will not be repeated herein.

In some exemplary implementation modes, when the 2T1R drive mode is used in the touch panel, first touch leads may be led out from upper and lower sides of the touch region, and second touch leads may be led out from left and right sides. For example, the second touch peripheral region on an upper side of the planar region includes multiple second touch leads, the second touch peripheral region on a left side includes multiple first touch leads and multiple second touch leads, the second touch peripheral region on a right side includes multiple first touch leads and multiple second touch leads, and the second touch peripheral region on a lower side includes multiple first touch leads and multiple second touch leads. Second touch peripheral regions on four sides of the planar region each include a ground line, a first shielding line, and a second shielding line. The first touch peripheral region at an upper left corner of the touch panel may include: lead connecting lines connecting second touch leads in second touch peripheral regions on the upper side and the left side, lead connecting lines connecting second touch units (including, for example, a first touch unit in the first bent region B1 and a second touch unit in the first notch C1 of the planar region A1) at an upper left corner position of the touch panel and second touch leads in the second touch peripheral region on the left side, a ground connecting line connecting ground lines in second touch peripheral regions on the upper side and the left side, and shielding connecting lines (including, for example, a first shielding connecting line connecting first shielding lines in the second touch peripheral regions on the upper side and the left side and a second shielding connecting line connecting second shielding lines in the second touch peripheral regions on the upper side and the left side). The first touch peripheral region at an upper right corner of the touch panel may include: lead connecting lines connecting second touch leads in the second touch peripheral regions on the upper side and the right side, lead connecting lines connecting second touch units (including, for example, a second touch unit in the third bent region B3 and a second touch unit in the second notch C2 of the planar region A1) at an upper right corner position of the touch panel and second touch leads in the second touch peripheral region on the right side, lead connecting lines connecting first touch units (including, for example, a first touch unit in the second bent region B2 and a first touch unit in the second notch C2 of the planar region A1) at the upper right corner position of the touch panel and first touch leads in the second touch peripheral region on the right side, a ground connecting line, and a shielding connecting line. Traces in first touch peripheral regions at the lower left corner and the lower right corner of the touch panel also includes, on a basis of the aforementioned embodiments, lead connecting lines connecting first touch leads in two adjacent second touch peripheral regions. However, this embodiment is not limited thereto.

In some exemplary implementation modes, as shown in FIG. 11, at least one second lead connecting line 502 includes an extending portion 5021 and a connecting end portion 5020 connected at both ends of the extending portion 5021. A width of the connecting end portion 5020 is greater than a width of the extending portion 5021. A connecting end portion 5020 of a second lead connecting line 502 is connected with a first touch lead 401 in the second touch peripheral region E51 through at least one first via K1. Connecting end portions 5020 of two adjacent second lead connecting lines 502 are arranged in a staggered manner. By arranging connecting end portions of multiple adjacent second lead connecting lines in a staggered manner, not only an effective connection between a second lead connecting line and a first touch lead may be ensured to improve transmission performance, but also a pitch between adjacent lead connecting lines may be reduced. In some examples, a manner of connecting a first lead connecting line 501 in the first touch peripheral region E12 with a second touch lead in the second touch peripheral region E52 is similar to a manner of connecting a second lead connecting line 502 with a first touch lead in the second touch peripheral region E51, and thus will not be repeated herein.

In some exemplary implementation modes, as shown in FIGS. 10 to 13, one end of the ground connecting line 503 may be connected with a ground line 403 in the second touch peripheral region E51 through at least one second via K2, and the other end may be connected with a ground line 403 in the second touch peripheral region E52 through multiple second vias. For example, one end of the ground connecting line 503 may be connected with the ground line 403 in the second touch peripheral region E52 through five second vias, and the other end may be connected with the ground line 403 in the second touch peripheral region E51 through two second vias. One end of the first shielding connecting line 504 may be connected with a first shielding line 404 in the second touch peripheral region E51 through at least one fourth via K4, and the other end may be connected with a first shielding line 404 in the second touch peripheral region E52 through at least one fourth via. One end of the second shielding connecting line 505 may be connected with a second shielding line 405 in the second touch peripheral region E51 through multiple third vias K3 (e.g., four third vias), and the other end may be connected with a second shielding line 405 in the second touch peripheral region E52 through multiple third vias (e.g., five third vias). However, this embodiment is not limited thereto.

In the present disclosure, a width represents a feature size of a trace in a direction perpendicular to an extension direction. A length represents a feature size of the trace in the extension direction. A thickness represents a vertical distance between a surface of the trace away from a base substrate and a surface of the trace close to the base substrate.

FIG. 9 is a schematic partial sectional view taken along a direction P-P in FIG. 8. In some exemplary implementation modes, as shown in FIG. 9, in a plane perpendicular to the touch panel, the touch region 200 includes a touch base substrate 500, and a bridging layer, a touch insulation layer 51, a touch layer, and a protective layer 52 that are disposed on the touch base substrate 500 sequentially. The bridging layer includes, for example, a second connecting portion 222, and the touch layer includes, for example, a first touch electrode 211, a first connecting portion 212, and a second touch electrode 221. The first touch peripheral region E12 includes the touch base substrate 500, and the touch insulation layer 51, a light-transmitting first trace layer, and a protective layer 52 that are disposed on the touch base substrate 500 sequentially. The first trace layer includes multiple first lead connecting lines 501, multiple second lead connecting lines 502, a ground connecting line 503, a first shielding connecting line 504, and a second shielding connecting line 505. In some examples, a first lead connecting line 501 may be directly connected with the second touch electrode 221, or may be connected with the second touch electrode 221 through the bridging layer. However, this embodiment is not limited thereto.

In some examples, the bridging layer may be made of a metal material, such as any one or more of silver (Ag), copper (Cu), aluminum (Al), titanium (Ti), and molybdenum (Mo), or an alloy material of the aforementioned metals. The touch layer and the first trace layer may be made of a first conductive material having a light transmittance greater than about 90%. For example, the first conductive material may be a metal material having a transmittance greater than about 90%, or a transparent conductive material such as ITO and Indium Zinc Oxide (IZO). In the exemplary implementation mode, the first trace layer in the first touch peripheral region and the touch layer in the touch region are prepared synchronously and formed through a same patterning process, such that preparation processes may be simplified and a visual effect of the first touch peripheral region may be ensured.

FIG. 12 is a schematic partial sectional view taken along a direction Q-Q in FIG. 11. In some exemplary implementation modes, as shown in FIGS. 11 and 12, ground lines 403, first touch lead lines 401, first shielding lines 404, and second shielding lines 402 in second touch peripheral regions E52 and E51 are of a same-layer structure and are located on one side of the first trace layer 50 close to the touch base substrate 500. A second lead connecting line 502 may be connected with a first touch lead 401 through a first via K1 on the touch insulation layer 51. The ground connecting line 503 is connected with the ground line 403 through multiple second vias K2 on the touch insulation layer 51. The first shielding connecting line 504 is connected with the first shielding line 404 through a fourth via K4 on the touch insulation layer 51. The second shielding connecting line 505 is connected with the second shielding line 405 through multiple third vias K3 on the touch insulation layer 51. In this example, a touch lead and the bridging layer are of a same-layer structure and may be prepared through a same patterning process. However, this embodiment is not limited thereto.

A structure of the touch panel according to the embodiment of the present disclosure will be described below through an example of a preparation process of the touch panel. A "patterning process" mentioned in the present disclosure includes a process such as deposition of a film layer, photoresist coating, mask exposure, development, etching, and photoresist stripping. Deposition may be implemented using any one or more of sputtering, evaporation, and chemical vapor deposition, coating may be implemented using any one or more of spray coating and spin coating, and etching may be implemented using any one or more of dry etching and wet etching. A "thin film" refers to a layer of thin film formed by a material on a base substrate using a deposition or coating process. If the "thin film" does not need a patterning process in an entire preparation process, the "thin film" may also be called a "layer". If the "thin film" needs the patterning process in the entire preparation process, the "thin film" is called a "thin film" before the patterning process and is called a "layer" after the patterning process. The "layer" after the patterning process includes at least one "pattern".

"A and B are disposed on a same layer" mentioned in the present disclosure means that A and B are formed simultaneously through a same patterning process. A "same layer" does not always mean that thicknesses of layers or heights of the layers are the same in a sectional view. "An orthographic projection of A contains an orthographic projection of B" means that the orthographic projection of B falls within a range of the orthographic projection of A, or the orthographic projection of A covers the orthographic projection of B.

In some exemplary implementation modes, the preparation process of the touch panel according to this exemplary embodiment may include following acts.

(1) Providing a Touch Base Substrate.

In some exemplary implementation modes, the touch base substrate may be made of a flexible material, such as Cycloolefin Polymer (COP), Polyimide (PI), Polyethylene Terephthalate (PET) and the like. However, this embodiment is not limited thereto.

(2) Preparing Patterns of a Bridging Layer and a Second Trace Layer on the Touch Base Substrate.

In some exemplary implementation modes, a second conductive thin film is deposited on the touch base substrate 500, and the second conductive thin film is patterned through a patterning processes to form the patterns of the bridging layer and the second trace layer disposed on the touch base substrate 500, as shown in FIGS. 8 to 13. A pattern of the bridging layer is formed in a touch region 200 and at least includes a second connecting portion 222. A pattern of the second trace layer pattern is formed in a second touch peripheral region and at least includes multiple touch leads (including, for example, multiple first touch leads 401 and multiple second touch leads 402), a second shielding line located between the first touch leads and the second touch leads, a first shielding line 404 and a ground line 403 located on one side of the multiple touch leads away from the touch region 200.

In some examples, the second conductive thin film may be made of a metal material, such as any one or more of silver (Ag), copper (Cu), aluminum (Al), titanium (Ti), and molybdenum (Mo), or an alloy material of the above metals, such as an Aluminum Neodymium (AlNd) alloy or a Molybdenum Niobium (MoNb) alloy, and may be of a single-layer structure or a multi-layer composite structure, such as Ti/Al/Ti.

(3) Preparing a Touch Insulation Layer on the Touch Base Substrate.

In some exemplary implementation modes, a touch insulation material is coated on the touch base substrate on which the aforementioned structures are formed, to form a touch insulation layer 51 covering the bridging layer, and multiple vias, including, for example, multiple first vias K1, multiple second vias K2, multiple third vias K3, a fourth via K4, and multiple fifth vias, are formed on the touch insulation layer 51 through a patterning process, as shown in FIGS. 8 to 13. The multiple first vias K1, the multiple second vias K2, the multiple third vias K3, and the fourth via K4 are formed at a boundary of a second touch peripheral region close to a first touch peripheral region E12. The touch insulation layer 51 in a first via K1 is etched away to expose a surface of a first touch lead 401 or a second touch lead 402, and the touch insulation layer 51 in a second via K2 is etched away to expose a surface of the ground line 403. The touch insulation layer 51 in a third via K3 is etched away to expose a surface of a second shielding line 405. The touch insulation layer 51 in the fourth via K4 is etched sway to expose a surface of the first insulation line 404. The multiple fifth vias are formed in the touch region 200 and the touch insulation layer 51 in a fifth via is etched away to expose a surface of the bridging layer.

In some examples, the touch insulation material may be made of an organic material such as polyimide, acrylic, or polyethylene terephthalate.

(4) Preparing Patterns of a Touch Layer and a First Trace Layer on the Touch Base Substrate.

In some exemplary implementation modes, a first conductive thin film is deposited on the touch base substrate 500, on which the aforementioned structures are formed, and the first conductive thin film is patterned through a patterning process to form patterns of the touch layer and the first trace layer pattern disposed on the touch base substrate 500, as shown in FIGS. 8 to 13. The touch layer is formed in the touch region 200 and at least includes a first touch electrode 211, a second touch electrode 221, and s first connecting portion 212. The second touch electrode 221 is connected with a second connecting portion 222 of the bridging layer through a third via. The first trace layer is formed in the first touch peripheral region E12 and at least includes multiple lead connecting lines (including, for example, multiple first lead connecting lines 501 and multiple second lead connecting lines 502), a first shielding connecting line 504 and a ground connecting line 503 located on one side of the multiple lead connecting lines away from the touch region 200, and a second shielding connecting line 505 located between a first lead connecting line 501 and a second lead connecting line 502. At least one lead connecting line is connected with a first touch lead or a second touch lead in an adjacent second touch peripheral region through a first via K1. The first shielding connecting line 504 is connected with a first shielding line 404 in an adjacent second touch peripheral region through the fourth via K4. The ground connecting line 503 is connected with a ground line 403 in an adjacent second touch peripheral region through the multiple second vias K2. The second shielding connecting line 505 is connected with a second shielding line 405 in an adjacent second touch peripheral region through the multiple third vias K3.

In some exemplary implementation modes, at an intersection boundary of the touch region and a first touch peripheral region, a first touch unit may be directly connected with a lead connecting line, and a second touch unit may be directly connected with a lead connecting line or connected with a lead connecting line through a via. At an intersection boundary of the touch region and a second touch peripheral region, a first touch unit may be connected with a first touch lead through a via, and a second touch unit may be connected with a second touch lead through a via. However, this embodiment is not limited thereto.

In some exemplary implementation modes, the first conductive thin film may be made of a first conductive material, and the first conductive material is, for example, a metal material having a light transmittance greater than about 90%, or a transparent conductive material such as Indium Tin Oxide (ITO) or Indium Zinc Oxide (IZO). In some exemplary implementation modes, the first conductive thin film is made of a conductive material having a light transmittance greater than about 90%, and the second conductive thin film is made of a second conductive material, such as a metal material. Since surface resistances of the first conductive material and the second conductive material are different, in order to ensure that an overall trace impedance is consistent, a ratio of a trace width of a same trace on a first trace layer to a trace width of the same trace on a second trace layer needs to meet a following condition.

$$\frac{S_a}{S_b} = \frac{\rho_a}{\rho_b}$$

Sa is a trace width of the first trace layer, Sb is a trace width of the second trace layer, $\rho_a$ is a surface resistance of the first conductive material of the first trace layer, and $\rho_b$ is a surface resistance of the second conductive material of the second trace layer. For example, a ratio of a trace width of a lead connecting line of the first trace layer to a trace width of a connected touch lead of the second trace layer and a ratio of a trace width of a shielding connecting line of the first trace layer to a trace width of a connected shielding line of the second trace layer are both approximately equal to a ratio of a surface resistance of the first conductive material to a surface resistance of the second conductive material.

In this exemplary implementation mode, on a premise that thicknesses and lengths of traces are the same, a width of a trace made of a material with a larger surface resistance is larger, that is, a surface resistance of a material is directly proportional to a trace width. Therefore, consistency of trace impedance may be ensured by adjusting a width of a trace connected between the first trace layer and the second trace layer according to the ratio of the surface resistance of the first conductive material to the surface resistance of the second conductive material.

In some exemplary implementation modes, the first trace layer may be made of a metal material having a transmittance greater than about 90%, and a surface resistance of such a metal material is about 10 $\Omega/m^2$, such that space required by a trace of the first trace layer may be reduced effectively, thereby increasing an area of the touch region.

(5) Preparing a Protective Layer on the Touch Base Substrate.

In some exemplary implementation modes, a protective thin film is coated on the touch base substrate 500 on which the aforementioned structures are formed, to form a protective layer 52 covering the touch layer and the first trace layer, as shown in FIGS. 9 and 12.

In some exemplary implementation modes, the protective thin film may be made of a material such as polyimide, acrylic, or polyethylene terephthalate.

After preparation of the aforementioned film structures are completed, four corner positions of the touch panel may be cut through a cutting process to form four notches and four mutually independent bent regions.

The preparation process of this exemplary embodiment may be implemented using an existing mature preparation device with relatively small improvement made to existing processes, and may be well compatible with existing preparation processes. This process is simple to achieve and easy to implement, an efficiency of production is high, a production cost is low, and a yield is high.

In the touch panel according to this exemplary embodiment, since areas of regions of the four notches are relatively small, implementation of normal touch performance at the four corner positions of the touch panel may be ensured by compensating a touch algorithm.

The structure of the touch panel and the preparation process thereof according to this exemplary embodiment of the present disclosure are merely illustrative. In some exemplary implementation modes, corresponding structures may be altered and patterning processes may be increased or decreased according to actual needs. For example, the touch panel may include the touch base substrate, and the touch layer, the touch insulation layer, the bridging layer, and the protective layer that are disposed on the touch base substrate sequentially. The first trace layer and the touch layer are of a same-layer structure, and the second trace layer and the bridging layer are of a same-layer structure. As another example, first touch lead connected with first touch units may all be located in touch peripheral regions on a right side or a left side of the touch region. However, this embodiment is not limited thereto.

Figure 18:
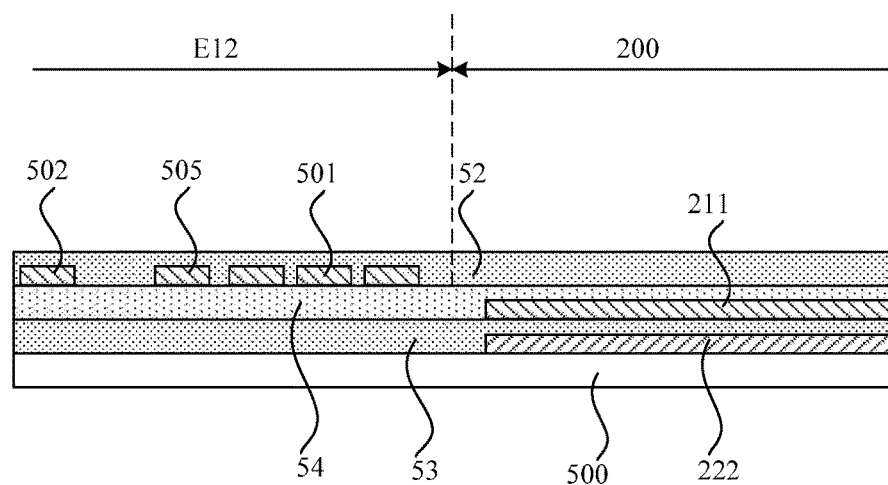
FIG. 18 is another schematic partial sectional view taken along the direction P-P in FIG. 8.

FIG. 18 is another schematic partial sectional view taken along the direction P-P in FIG. 8. As shown in FIG. 18, in a plane perpendicular to the touch panel, the touch region 200 includes a touch base substrate 500, and a bridging layer, a first touch insulation layer 53, a touch layer, a second touch insulation layer 54, and a protective layer 52 that are disposed on the touch base substrate 500 sequentially. The bridging layer includes, for example, a second connecting portion 222, and the touch layer includes, for example, a first touch electrode 211, a first connecting portion 212, and a second touch electrode 221. The first touch peripheral region E12 includes the touch base substrate 500, and the first touch insulation layer 53, the second touch insulation layer 54, a first trace layer, and the protective layer 52 that are disposed on the touch base substrate 500 sequentially. The first trace layer may include: multiple first lead connecting lines 501, multiple second lead connecting lines 502 located on one side of the multiple first lead connecting lines 501 away from the touch region 200, a second shielding connecting line 505 located between the multiple first lead connecting lines 501 and the multiple second lead connecting lines 502, a first shielding connecting line 504 located on one side of the multiple second lead connecting lines 502 away from the touch region 200, and a ground connecting line 503 located on one side of the first shielding connecting line 504 away from the touch region 200. However, this embodiment is not limited thereto. In some examples, the first trace layer may be located on one side of the touch layer close to the touch base substrate and on one side of the bridging layer away from the touch base substrate; or the first trace layer may be located on one side of the bridging layer close to the touch base substrate.

In some examples, the bridging layer may be made of a metal material, such as any one or more of silver (Ag), copper (Cu), aluminum (Al), titanium (Ti), and molybdenum (Mo), or an alloy material of the above metals. The touch layer may be made of a transparent conductive material, such as ITO. The first trace layer may be made of a conductive material having a light transmittance greater than about 90%, such as a metal material having a light transmittance greater than about 90%. Materials of the touch layer and the first trace layer may be different or the same. In this exemplary implementation mode, the first trace layer is made of a conductive material with a light transmittance greater than about 90%, such that a visual effect of the first touch peripheral region overlapping with the display region may be ensured.

In some examples, the second touch peripheral region may include the touch base substrate 500, and a second trace layer, a first touch insulation layer, a second touch insulation layer, and the protective layer that are disposed on the touch base substrate 500 sequentially. Or, the second touch peripheral region may include the touch base substrate 500, and a first touch insulation layer, a second trace layer, a second touch insulation layer, and the protective layer that are disposed on the touch base substrate 500 sequentially. The second trace layer may be of a same-layer structure as the touch layer in the touch region or the bridging layer. However, this embodiment is not limited thereto.

Other structures of the touch panel in this exemplary implementation mode are similar to corresponding structures described in the aforementioned embodiments, and thus will not be repeated herein.

The structure (or method) shown in this implementation mode may be combined with structures (or methods) shown in other implementation modes appropriately.

Figure 19:
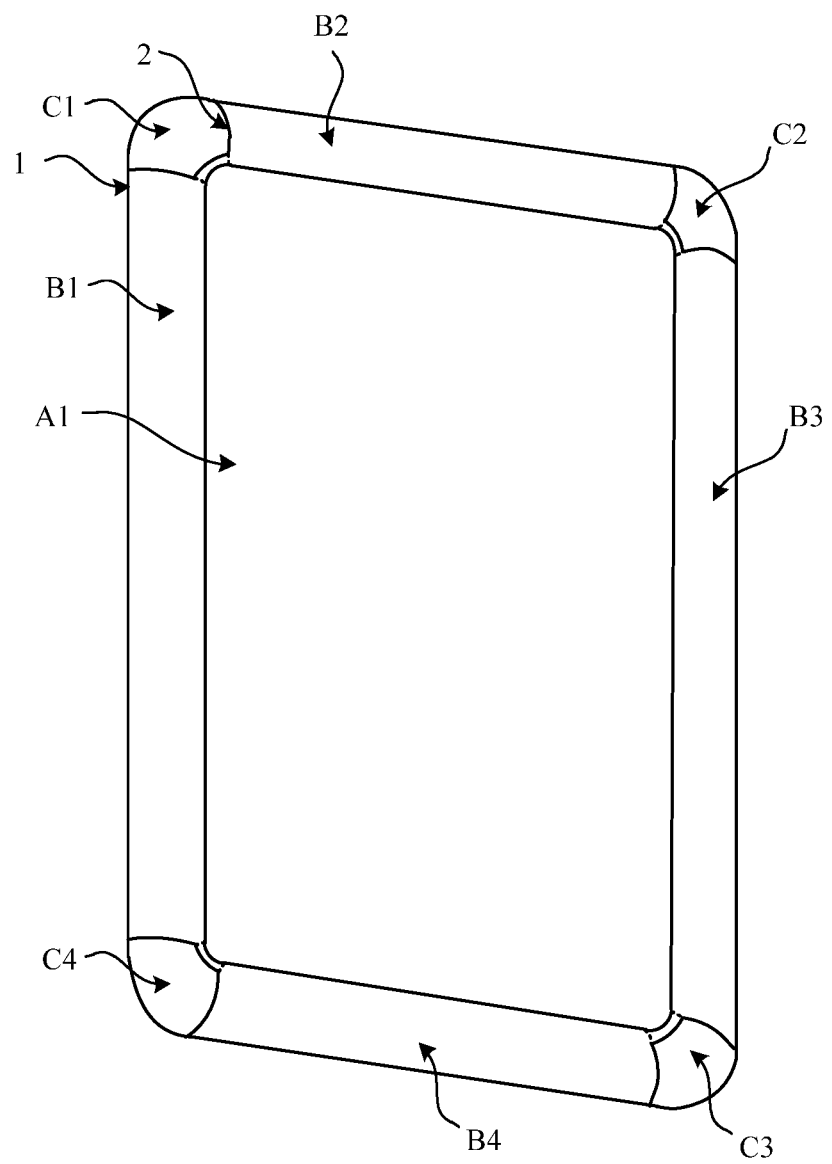
FIG. 19 is another schematic stereogram of a display touch apparatus according to at least one embodiment of the present disclosure.
Figure 20:
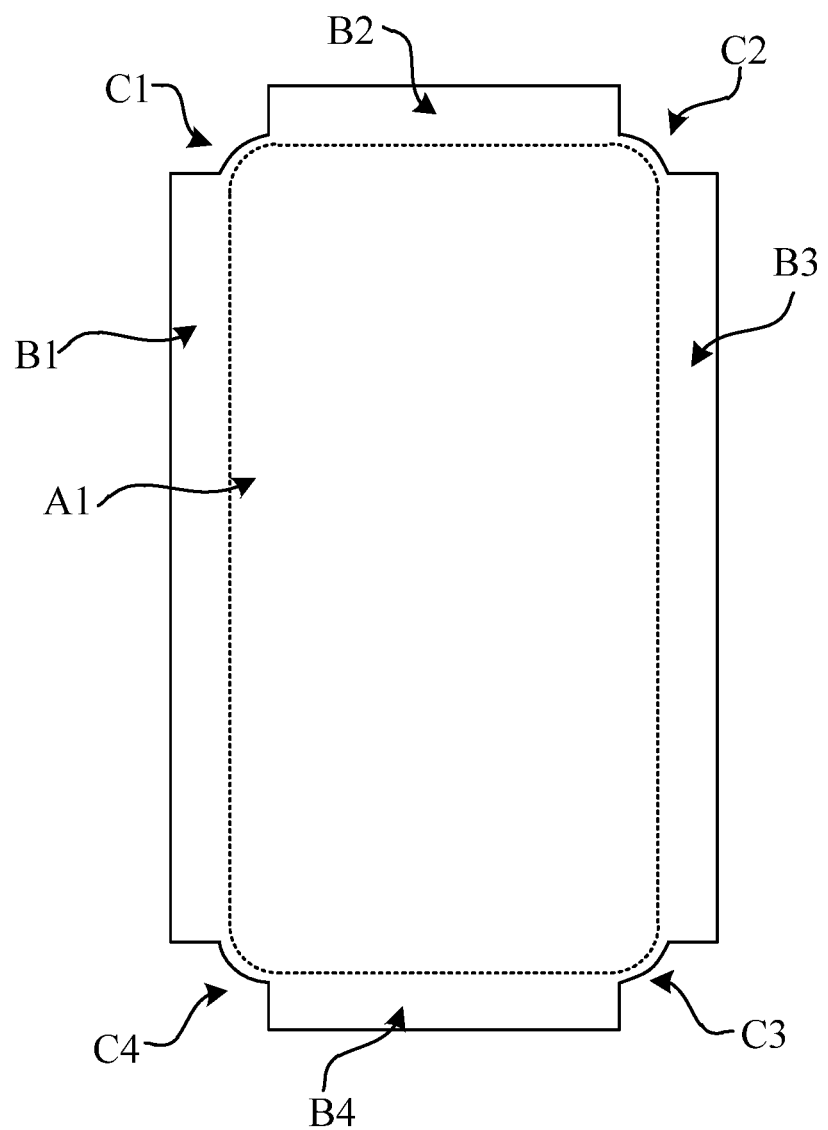
FIG. 20 is another schematic plane view of a touch panel according to at least one embodiment of the present disclosure.

FIG. 19 is another schematic stereogram of a display touch apparatus according to at least one embodiment of the present disclosure. FIG. 20 is another schematic plane view of a touch panel according to at least one embodiment of the present disclosure. FIG. 20 is a schematic top view of the touch panel of the display touch apparatus shown in FIG. 19 with its four sides being in an unbent state. As shown in FIGS. 19 and 20, in this exemplary implementation mode, a touch panel 2 includes a planar region A1 and bent regions (i.e., a first bent region B1 to a fourth bent region B4) located on four sides of the planar region A1. The planar region A1 is approximately in a shape of a rounded rectangle. An outside of four corner regions of the planar region A1 is not only provided with four notches (i.e., a first notch C1 to a fourth notch C4), but also a portion may be reserved to form a connection region between adjacent bent regions so that the adjacent bent regions may be communicated. In this example, the connection region between the adjacent bent regions is located between the planar region A1 and a notch.

Other structures of the touch panel in this exemplary implementation mode are similar to corresponding structures described in the aforementioned embodiments, and thus will not be repeated herein.

The structure (or method) shown in this implementation mode may be combined with structures (or methods) shown in other implementation modes appropriately.

Figure 21:
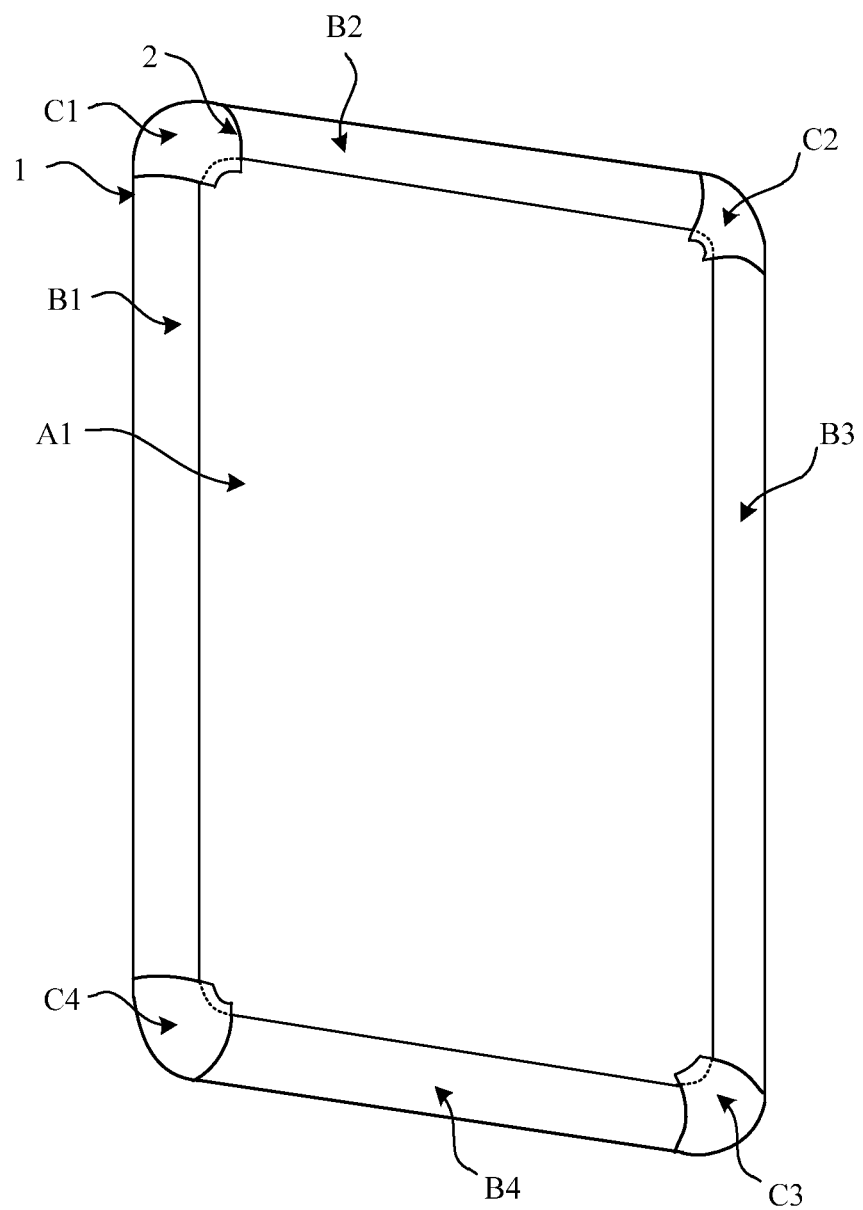
FIG. 21 is another schematic stereogram of a display touch apparatus according to at least one embodiment of the present disclosure.
Figure 22:
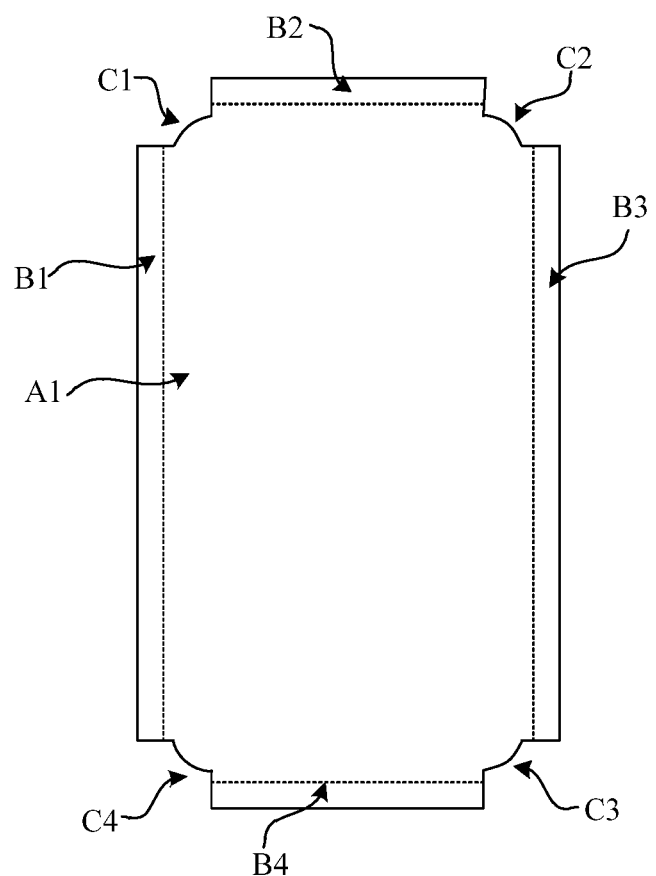
FIG. 22 is another schematic plane view of a touch panel according to at least one embodiment of the present disclosure.

FIG. 21 is another schematic stereogram of a display touch apparatus according to at least one embodiment of the present disclosure. FIG. 22 is another schematic plane view of a touch panel according to at least one embodiment of the present disclosure. FIG. 22 is a schematic top view of the touch panel of the display touch apparatus shown in FIG. 21 with its four sides being in an unbent state. As shown in FIGS. 21 and 22, in this exemplary implementation mode, a touch panel 2 includes a planar region A1 and bent regions (i.e., a first bent region B1 to a fourth bent region B4) located on four sides of the planar region A1. The planar region A1 is in a shape formed by cutting four corner regions of a rounded rectangle, and a shape cut out at corner regions of the rounded rectangle is approximately a fan ring shape. However, this embodiment is not limited thereto.

Other structures of the touch panel in this exemplary implementation mode are similar to corresponding structures described in the aforementioned embodiments, and thus will not be repeated herein.

The structure (or method) shown in this implementation mode may be combined with structures (or methods) shown in other implementation modes appropriately.

In some exemplary implementation modes, a touch panel uses an encapsulation layer of a display panel as a touch base substrate to form an on-cell structure. In some examples, the display panel includes an OLED display substrate, and the touch panel is disposed on an encapsulation layer of the OLED display substrate to form a Flexible Multi-Layer On Cell (FMLOC) structure in which a display structure is integrated with a touch structure. The FMLOC structure has advantages of being light, thin, and foldable, and may meet product requirements such as flexible folding and a narrow border.

Figure 23:
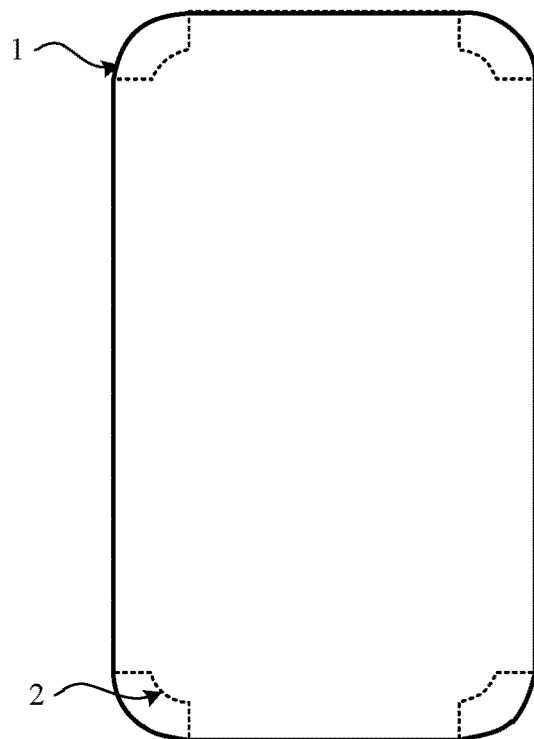
FIG. 23 is a schematic plane view of another display touch apparatus according to at least one embodiment of the present disclosure.

FIG. 23 is a schematic diagram of a planar structure of a display touch apparatus according to at least one embodiment of the present disclosure. FIG. 23 is a schematic top view of the display touch apparatus with its four sides being in an unbent state. In some exemplary implementation modes, as shown in FIG. 23, a touch panel 2 is disposed on an encapsulation layer of a display panel 1 and the encapsulation layer of the display panel 1 is used as a touch base substrate. In a plane parallel to the touch panel, the touch panel 2 may include a touch region and a touch peripheral region located at a periphery of the touch region. The display panel 1 may include a display region and a display peripheral region located at a periphery of the display region. Related description about the touch region and the touch peripheral region may be u referred to description of a previous embodiment, and thus will not be repeated herein.

Figure 24:
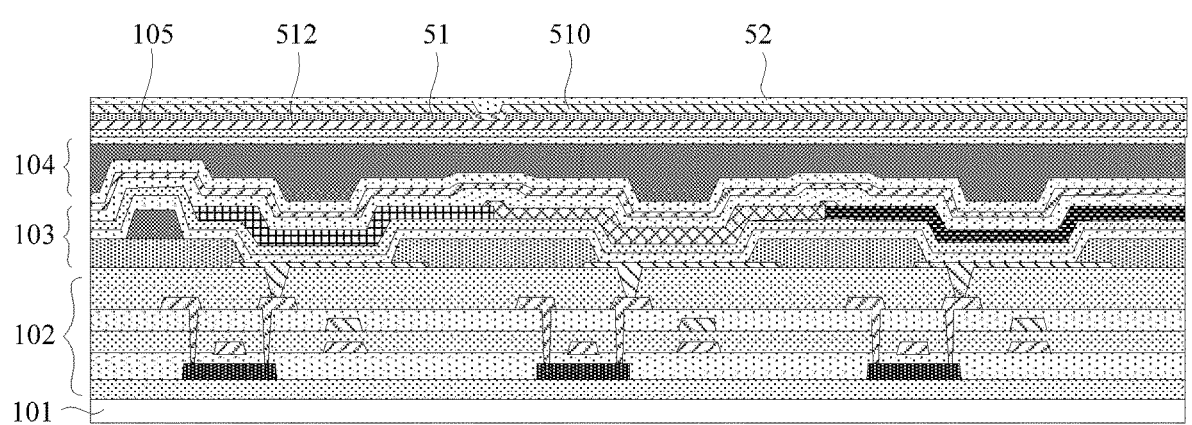
FIG. 24 is a schematic partial sectional view of a display touch apparatus according to at least one embodiment of the present disclosure.

FIG. 24 is a schematic sectional view of the display touch apparatus shown in FIG. 23. A structure of three sub-pixels is illustrated in FIG. 24. In some exemplary implementation modes, in a plane perpendicular to the display touch apparatus, a display panel may include a drive circuit layer 102 disposed on a base substrate 101, a light emitting device 103 disposed on one side of the drive circuit layer 102 away from the base substrate 101, and an encapsulation layer 104 disposed on one side of the light emitting device 103 away from the base substrate 101. In some examples, the display panel may include another film layer, such as a post spacer, which is not limited in the embodiment of the present disclosure.

In some exemplary implementation modes, the base substrate 101 may be a flexible base substrate. The flexible base substrate may include a first flexible material layer, a first inorganic material layer, a semiconductor layer, a second flexible material layer, and a second inorganic material layer which are stacked. Materials of the first flexible material layer and the second flexible material layer may be polyimide (PI), Polyethylene Terephthalate (PET), a surface-treated polymer soft film, or other materials; materials of the first inorganic material layer and the second inorganic material layer may be Silicon Nitride (SiNx) or Silicon Oxide (SiOx), etc., for improving water and oxygen resistance of the base substrate; and a material of the semiconductor layer may be amorphous silicon (a-si). However, this embodiment is not limited thereto.

In some exemplary implementation modes, a drive circuit layer 102 of each sub-pixel may include multiple transistors and a storage capacitor which constitute a pixel drive circuit. Each sub-pixel including a drive transistor and a storage capacitor is illustrated in FIG. 21 as an example. In some examples, the drive circuit layer 102 of each sub-pixel may include: a first insulation layer disposed on the base substrate 101; an active layer disposed on the first insulation layer; a second insulation layer covering the active layer; a gate electrode and a first capacitance electrode arranged on the second insulation layer; a third insulation layer covering the gate electrode and the first capacitance electrode; a second capacitance electrode arranged on the third insulation layer; a fourth insulation layer covering the second capacitance electrode, vias being provided on the second insulation layer, the third insulation layer, and the fourth insulation layer and exposing the active layer; a source electrode and a drain electrode arranged on the fourth insulation layer, the source electrode and the drain electrode being respectively connected with the active layer through the vias; and a planarization layer covering a foregoing structure, vias being provided on the planarization layer and exposing the drain electrode. The active layer, the gate electrode, the source electrode, and the drain electrode form the drive transistor, and the first capacitor electrode and the second capacitor electrode form the storage capacitor.

In some exemplary implementation modes, the light emitting device 103 may include an anode, a pixel definition layer, an organic emitting layer, and a cathode. The anode is disposed on the planarization layer, and is connected with the drain electrode of the drive transistor through the vias provided on the planarization layer; the pixel definition layer is disposed on the anode and the planarization layer, and a pixel opening is provided on the pixel definition layer and exposes the anode; the organic emitting layer is at least partially disposed in the pixel opening and is connected with the anode; the cathode is disposed on the organic emitting layer and is connected with the organic emitting layer; and the organic emitting layer emits light of a corresponding color under drive of the anode and the cathode.

In some exemplary implementation modes, the encapsulation layer 104 may include a first encapsulation layer, a second encapsulation layer, and a third encapsulation layer which are stacked. The first encapsulation layer and the third encapsulation layer may be made of inorganic materials. The second encapsulation layer may be made of an organic material. The second encapsulation layer is disposed between the first encapsulation layer and the third encapsulation layer so as to ensure that external water vapor cannot enter the light emitting device 103.

In some exemplary implementation modes, the organic emitting layer of the light emitting device 103 may include an Emitting Layer (EML), and include one or more film layers of a Hole Injection Layer (HIL), a Hole Transport Layer (HTL), a Hole Block Layer (HBL), an Electron Block Layer (EBL), an Electron Injection Layer (EIL), and an Electron Transport Layer (ETL). Under voltage drive of the anode and the cathode, light is emitted according to a required gray scale using light emitting properties of organic materials.

In some exemplary implementation modes, emitting layers of light emitting elements of different colors are different. For example, a red light emitting element includes a red emitting layer, a green light emitting element includes a green emitting layer, and a blue light emitting element includes a blue emitting layer. In order to decrease a process difficulty and improve a yield, a common layer may be used for a hole injection layer and a hole transport layer located on one side of an emitting layer, and a common layer may be used for an electron injection layer and an electron transport layer located on the other side of the emitting layer. In some examples, any one or more layers of the hole injection layer, the hole transport layer, the electron injection layer, and the electron transport layer may be made through one process (one evaporation process or one inkjet printing process), and implement isolation by means of a formed film layer surface segment difference or by means of a surface treatment. For example, any one or more layers of the hole injection layer, the hole transport layer, the electron injection layer, and the electron transport layer corresponding to adjacent sub-pixels may be isolated. In some examples, the organic emitting layer may be prepared and formed through evaporation using a Fine Metal Mask (FMM) or an open mask, or prepared and formed using an inkjet process.

In some exemplary implementation mode, on a plane perpendicular to a touch panel, the touch panel may include a buffer layer 105 disposed on one side of the encapsulation layer 104 away from the base substrate 101, a second conductive layer 512 disposed on one side of the buffer layer 105 away from the base substrate 101, a touch insulation layer 51 disposed on one side of the second conductive layer 512 away from the base substrate 101, a first conductive layer 510 disposed on one side of the insulation layer 51 away from the base substrate 101, and a protective layer 52 disposed on one side of the first conductive layer 510 away from the base substrate 101. The first conductive layer 510 may include a touch layer located in a touch region (including, for example, a first touch electrode, a second touch electrode, and a first connecting portion) and a first trace layer located in a touch peripheral region (including, for example, a shielding connecting line and multiple lead connecting lines). The second conductive layer 512 may include a bridging layer located in the touch region (including, for example, a second connecting portion, adjacent second touch electrodes are connected with each other through a via) and a second trace layer located in the touch peripheral region (including, for example, a shielding line and multiple touch leads).

In some exemplary implementation modes, the buffer layer 105, the touch insulation layer 51, and the protective layer 52 may be made of organic materials. The second conductive layer 512 may be made of a metal material, such as any one or more of silver (Ag), copper (Cu), aluminum (Al), titanium (Ti), and molybdenum (Mo), or an alloy material of the aforementioned metals. The first conductive layer 510 may be made of a conductive material having a transmittance greater than about 90%, such as a metal material having a transmittance greater than 90%, or a transparent conductive material such as ITO. However, this embodiment is not limited thereto.

Related structures of the touch panel in this exemplary implementation mode are similar to corresponding structures described in the aforementioned embodiments, and thus will not be repeated herein.

The structure (or method) shown in this implementation mode may be combined with structures (or methods) shown in other implementation modes appropriately.

In some exemplary implementation modes, the display touch apparatus according to this exemplary embodiment may be any product or component with display and touch functions, such as a mobile phone, a tablet computer, a television, a display, a notebook computer, a digital photo frame, or a navigator.

At least one embodiment of the present disclosure further provides a preparation method of a touch panel. The touch panel includes a planar region and a bent region located on at least one side of the planar region. The touch panel has at least one notch adjacent to the bent region. The preparation method includes forming a light-transmitting first trace layer in at least one first touch peripheral region located around the at least one notch.

In some exemplary implementation modes, the preparation method further includes forming a second trace layer in at least one second touch peripheral region that is at least partially overlapped with at least one bent region, the first trace layer in the first touch peripheral region being electrically connected with the second trace layer in an adjacent second touch peripheral region.

The preparation method of this embodiment may be referred to descriptions of the above-mentioned embodiments, and thus will not be repeated herein.

The drawings of the present disclosure relate only to the structures involved in the present disclosure, and other structures may be referred to usual designs. The embodiments of the present disclosure and features in the embodiments may be combined with each other to obtain new embodiments without conflict.

Those of ordinary skill in the art should understand that modifications or equivalent substitutions may be made to the technical solutions of the present disclosure without departing from the spirit and scope of the technical solutions of the present disclosure, shall all fall within the scope of the claims of the present disclosure.

The invention claimed is:

1. A touch panel comprising:
   a planar region and a bent region located on at least one side of the planar region;
   wherein the touch panel has at least one notch adjacent to the bent region; the touch panel comprises at least one first touch peripheral region located around the at least one notch, and a light-transmitting first trace layer is provided in the at least one first touch peripheral region;
   further comprising at least one second touch peripheral region that is at least partially overlapped with at least one bent region, a second trace layer is provided in the at least one second touch peripheral region, and the second trace layer and the first trace layer are of a different-layer structure; and
   the first trace layer in the first touch peripheral region is electrically connected with a second trace layer in an adjacent second touch peripheral region.

2. The touch panel according to claim 1, wherein the planar region has multiple corner regions, and the at least one notch is located at a periphery of at least one corner region of the planar region.

3. The touch panel according to claim 2, wherein the planar region is approximately in a shape of a rounded rectangle, bent regions are provided on four sides of the planar region, and a notch is provided between bent regions on adjacent two sides.

4. The touch panel according to claim 1, wherein an edge of the touch panel corresponding to the at least one notch comprises a first straight line segment, a circular arc segment, and a second straight line segment connected sequentially, or an edge of the touch panel corresponding to the at least one notch comprises a first straight line segment, a first transition segment, a circular arc segment, a second transition segment, and a second straight line segment connected sequentially; an extension direction of the first straight line segment intersects an extension direction of the second straight line segment.

5. The touch panel according to claim 1, wherein the first touch peripheral region around the at least one notch is partially overlapped with the planar region and is partially overlapped with the bent region adjacent to the at least one notch.

6. The touch panel according to claim 1, further comprising a touch region that is partially overlapped with both the planar region and the at least one bent region;
wherein multiple first touch units and multiple second touch units are disposed in the touch region; at least one first touch unit comprises multiple first touch electrodes and multiple first connecting portions arranged sequentially along a first direction; at least one second touch unit comprises multiple second touch electrodes and multiple second connecting portions arranged sequentially along a second direction; the first direction intersects the second direction.

7. The touch panel according to claim 6, wherein the multiple first touch electrodes, the multiple second touch electrodes, and the multiple first connecting portions are disposed on a touch layer in a homo-layered manner, the multiple second connecting portions are disposed on a bridging layer, and a second connecting portion is interconnected with an adjacent second touch electrode through a via on a touch insulation layer between the bridging layer and the touch layer; or
the multiple first touch electrodes, the multiple second touch electrodes, and the multiple second connecting portions are disposed on a touch layer in a homo-layered manner, the multiple first connecting portions are disposed on a bridging layer, and a first connecting portion is interconnected with an adjacent first touch electrode through a via on a touch insulation layer between the bridging layer and the touch layer.

8. The touch panel according to claim 7, wherein the first trace layer and the touch layer are of a same-layer structure, and the second trace layer and the bridging layer are of a same-layer structure.

9. The touch panel according to claim 6, wherein the second trace layer in the at least one second touch peripheral region comprises at least one of following: multiple first touch leads and multiple second touch leads; a first touch lead is connected with a first touch unit, and a second touch lead is connected with a second touch unit; and
the first trace layer in the at least one first touch peripheral region comprises multiple lead connecting lines, and at least one of the multiple lead connecting lines is configured to be connected with a first touch lead or a second touch lead in the adjacent second touch peripheral region.

10. The touch panel according to claim 9, wherein the multiple lead connecting lines of the first trace layer have connecting end portions, and connecting end portions of adjacent lead connecting lines are arranged in a staggered manner.

11. The touch panel according to claim 1, wherein a ratio of a width of a same trace on the first trace layer to a width of the same trace on the second trace layer is approximately equal to a ratio of a surface resistance of a first conductive material used for the first trace layer to a surface resistance of a second conductive material used for the second trace layer.

12. The touch panel according to claim 11, wherein the first conductive material comprises a conductive material having a light transmittance greater than about 90%.

13. The touch panel according to claim 11, wherein the surface resistance of the first conductive material is about 10 Ω/m2.

14. A display touch apparatus comprising a display panel and the touch panel according to claim 1 disposed on the display panel.

15. The display touch apparatus according to claim 14, wherein a touch base substrate of the touch panel is disposed on the display panel to form an Add on Mode structure; or,
an encapsulation layer of the display panel is used as a touch base substrate of the touch panel to form an On-Cell structure.

16. The display touch apparatus according to claim 14, wherein at least one corner region of a planar region of the touch panel has a circular arc-shaped edge, and the circular arc-shaped edge of the corner region faces a circular arc-shaped edge of the display panel.

17. The display touch apparatus according to claim 14, wherein an orthographic projection of at least one notch of the touch panel on the display panel is partially overlapped with a display region of the display panel.

18. A preparation method of a touch panel, wherein the touch panel comprises a planar region and a bent region located on at least one side of the planar region; the touch panel has at least one notch adjacent to the bent region;
the preparation method comprises:
forming a light-transmitting first trace layer in at least one first touch peripheral region located around the at least one notch;
the preparation method is used to prepare the touch panel according to claim 1.

19. The preparation method according to claim 18, further comprising forming a second trace layer in a second touch peripheral region that is at least partially overlapped with at least one bent region, a first trace layer in the first touch peripheral region being electrically connected with a second trace layer in an adjacent second touch peripheral region.

* * * * *